(12) United States Patent
Whatcott et al.

(10) Patent No.: US 9,446,542 B2
(45) Date of Patent: Sep. 20, 2016

(54) SMALL FOOTPRINT APPARATUS, METHOD, AND TOOLING FOR MOLDING LARGE THERMOPLASTIC PARTS

(71) Applicant: EdiZONE, LLC, Alpine, UT (US)

(72) Inventors: Russell B. Whatcott, Eagle Mountain, UT (US); LaVon Lee Bennett, Alpine, UT (US)

(73) Assignee: Edizone, LLC, Alpine, UT (US)

( * ) Notice: Subject to any disclaimer, the term of this patent is extended or adjusted under 35 U.S.C. 154(b) by 267 days.

(21) Appl. No.: 14/144,362

(22) Filed: Dec. 30, 2013

(65) Prior Publication Data

US 2014/0183789 A1 Jul. 3, 2014

Related U.S. Application Data

(60) Provisional application No. 61/848,348, filed on Dec. 31, 2012.

(51) Int. Cl.
| | |
|---|---|
| *B29C 45/18* | (2006.01) |
| *B29C 45/17* | (2006.01) |
| *B29C 45/53* | (2006.01) |
| *B29C 45/54* | (2006.01) |
| *B29C 45/68* | (2006.01) |
| *B29L 31/00* | (2006.01) |
| *B29C 45/82* | (2006.01) |

(52) U.S. Cl.
CPC ......... *B29C 45/1761* (2013.01); *B29C 45/535* (2013.01); *B29C 45/542* (2013.01); *B29C 45/68* (2013.01); *B29C 45/82* (2013.01); *B29L 2031/7178* (2013.01); *B29L 2031/751* (2013.01)

(58) Field of Classification Search
CPC .................................................. B29C 45/353
USPC ....................................... 264/328.8; 425/120
See application file for complete search history.

(56) References Cited

U.S. PATENT DOCUMENTS

| | | | | |
|---|---|---|---|---|
| 3,861,841 A | * | 1/1975 | Hanning | B29C 44/421 |
| | | | | 425/146 |
| 5,192,555 A | * | 3/1993 | Arnott | B29C 45/0082 |
| | | | | 264/297.2 |
| 5,749,111 A | | 5/1998 | Pearce | |
| 6,026,527 A | | 2/2000 | Pearce | |
| 6,045,740 A | * | 4/2000 | Gorlich | B29C 45/02 |
| | | | | 264/297.2 |

* cited by examiner

*Primary Examiner* — Timothy Kennedy
(74) *Attorney, Agent, or Firm* — TraskBritt

(57) ABSTRACT

A molding system includes a plurality of injection heads each configured to inject molten polymer into a mold cavity. Each injection head has an outer body, a piston disposed within the outer body and defining a polymer chamber on a first side of the piston and a pressure chamber on an opposite second side of the piston. The piston moves from a retracted position to an extended position responsive to pressurization of the pressure chamber. Molten polymer is injected from the polymer chamber into the mold cavity as the piston moves from the retracted position to the extended position. Such systems may be used to mold relatively large articles of manufacture.

31 Claims, 15 Drawing Sheets

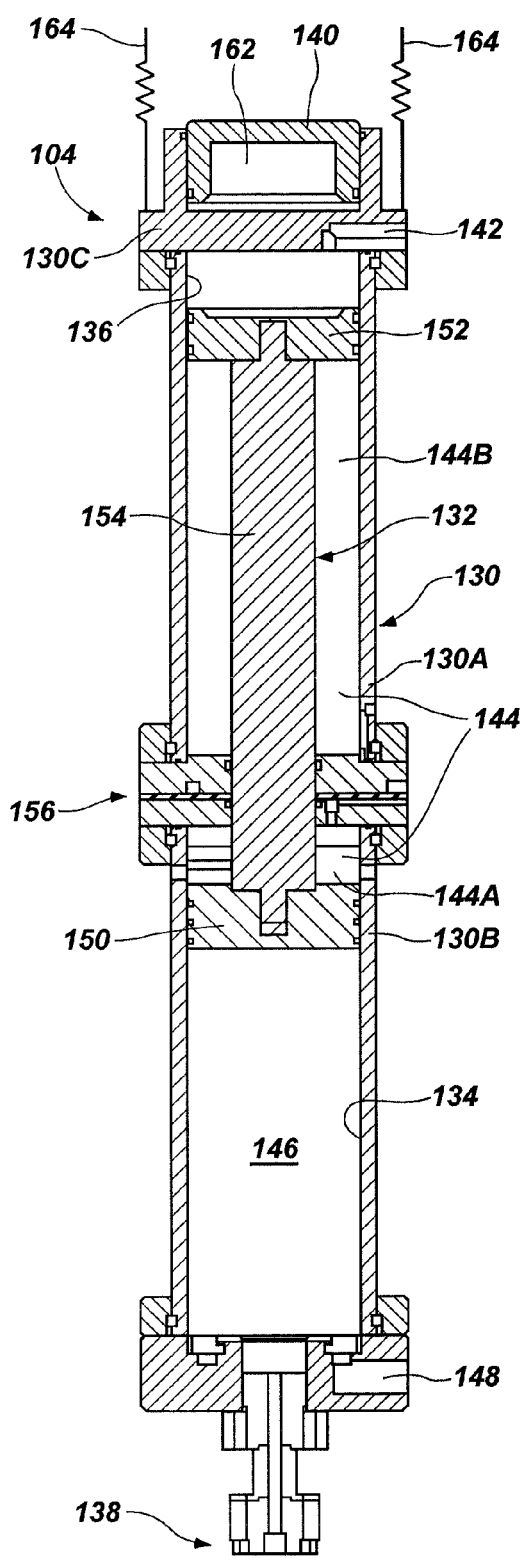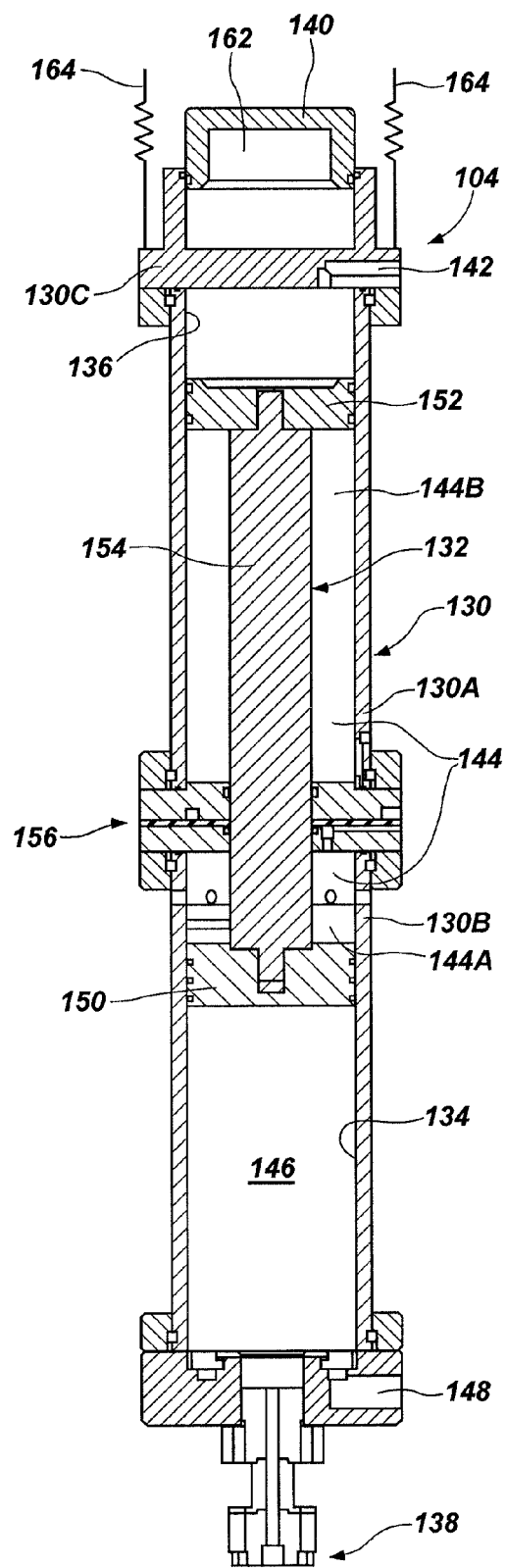
*FIG. 10B*          *FIG. 10C*

SMALL FOOTPRINT APPARATUS, METHOD, AND TOOLING FOR MOLDING LARGE THERMOPLASTIC PARTS

CROSS-REFERENCE TO RELATED APPLICATION

This application claims the benefit of U.S. Provisional Patent Application Ser. No. 61/848,348, filed Dec. 31, 2012, and entitled "SMALL FOOTPRINT APPARATUS, METHOD, AND TOOLING FOR MOLDING LARGE THERMOPLASTIC PARTS," the disclosure of which is incorporated herein by reference in its entirety.

TECHNICAL FIELD

Embodiments of the disclosure relate generally to molding systems and components thereof for use in molding relatively large thermoplastic parts, and to methods of making and using such molding systems and components thereof.

BACKGROUND

Thermoplastic molding systems generally employ a mold having a mold cavity therein, into which molten thermoplastic material is injected under pressure. The mold generally includes two or more mold pieces that define the mold cavity between the mold pieces when the mold pieces are adjoined to one another. The molding system generally includes two platens that support the mold pieces, respectively. One or both of the mold platens is movable, such that the mold may be closed to perform a molding cycle, and subsequently opened to allow removal of the molded part from the mold. As the molten thermoplastic material is injected under pressure, the thermoplastic material exerts pressure against the mold pieces that generates separating forces between the mold pieces. Therefore, the platens must apply counteracting closing force to the mold pieces to maintain the mold closed during the molding cycle. The closing force that the platens must apply to the mold increases with increasing size of the article being molded in the mold cavity. Thus, molding systems for molding relatively large articles of manufacture can be extremely large, and can require high hydraulic pressure and electric power for operation.

BRIEF SUMMARY

In some embodiments, the present disclosure includes a molding system. The molding system includes a mold defining a mold cavity therein, and a plurality of injection heads. Each injection head of the plurality of injection heads is configured to inject molten polymer into the mold cavity during a molding process. Each injection head of the plurality of injection heads has an outer body, a piston disposed within the outer body and defining a polymer chamber on a first side of the piston and a pressure chamber on an opposite second side of the piston. The piston is configured to move back and forth within the outer body between a retracted position and an extended position, and the piston is configured to move from the retracted position to the extended position responsive to pressurization of the pressure chamber. Each injection head further includes a nozzle through which molten polymer is injected from the polymer chamber into the mold cavity within the mold. The molding system further includes a polymer source configured to supply molten polymer to the polymer chamber of each injection head of the plurality of injection heads.

In additional embodiments, the present disclosure includes a method of molding an article of manufacture. In accordance with the method, a mold is provided having a mold cavity therein. A plurality of injection heads is provided, each of which injection heads includes an outer body, a piston disposed within the outer body and defining a polymer chamber on a first side of the piston and a pressure chamber on an opposite second side of the piston, and a nozzle. The piston is configured to move back and forth within the outer body between a retracted position and an extended position, and the piston is configured to move from the retracted position to the extended position responsive to pressurization of the pressure chamber. Molten polymer is injected from the polymer chamber through the nozzle into the mold cavity within the mold. The method further includes melting a polymer at a molten polymer source, and conveying molten polymer from the molten polymer source to the polymer chambers of the injection heads of the plurality of injection heads. The pressure chamber of each of at least two injection heads is pressurized, causing the piston to move from the retracted position to the extended position in each injection head of the plurality of injection heads to inject molten polymer into the mold cavity. The molten polymer is solidified within the mold cavity to form the article of manufacture.

BRIEF DESCRIPTION OF THE DRAWINGS

While the specification concludes with claims particularly pointing out and distinctly claiming that which are regarded as embodiments of the present invention, advantages of embodiments of the invention may be more readily ascertained from the description of certain non-limiting example embodiments of the invention set forth below, when read in conjunction with the accompanying drawings, in which:

FIG. 10B is a cross-sectional side view of the injection head of FIG. 10A illustrating molten polymer disposed within the injection head and a body of the injection head in a retracted position relative to a mounting member of the injection head, as the injection head would be after filling with the molten polymer and prior to commencement of a molding cycle;

FIG. 10C is a cross-sectional side view like that of FIG. 10B illustrating a body of the injection head in an extended position relative to a mounting member of the injection head, as it would be upon engagement with a mold of the molding system upon commencement of a molding cycle;

DETAILED DESCRIPTION

The illustrations presented herein are not meant to be actual views of any particular machine, system, or component thereof, but are merely idealized representations that are used to describe embodiments of the disclosure.

Embodiments of systems and methods of the present disclosure may be used to enable the molding of articles of manufacture that previously were considered too large for injection molding with prior art injection molding machines, or that were of a size requiring very large prior art injection molding machines. The systems and methods of the present disclosure may provide a less expensive molding system having a smaller footprint area compared to the footprint size of previously known injection molding machines used to mold articles of manufacture of the same size.

The molding systems disclosed herein may be configured, in some embodiments, for molding large elastomeric gel cushions such as those described in U.S. Pat. Nos. 5,749,111 and 6,026,527 (for example, a king size buckling gel mattress or king size buckling gel component of a mattress). Non-gel examples of parts that may be molded in the apparatus may be a plastic pallet for shipping stacks of boxed products or may be a plastic mattress foundation (used in place of "box springs"). Of course, the molding systems and methods disclosed herein may be used to mold other relatively large thermoplastic articles of manufacture.

Figure 1:
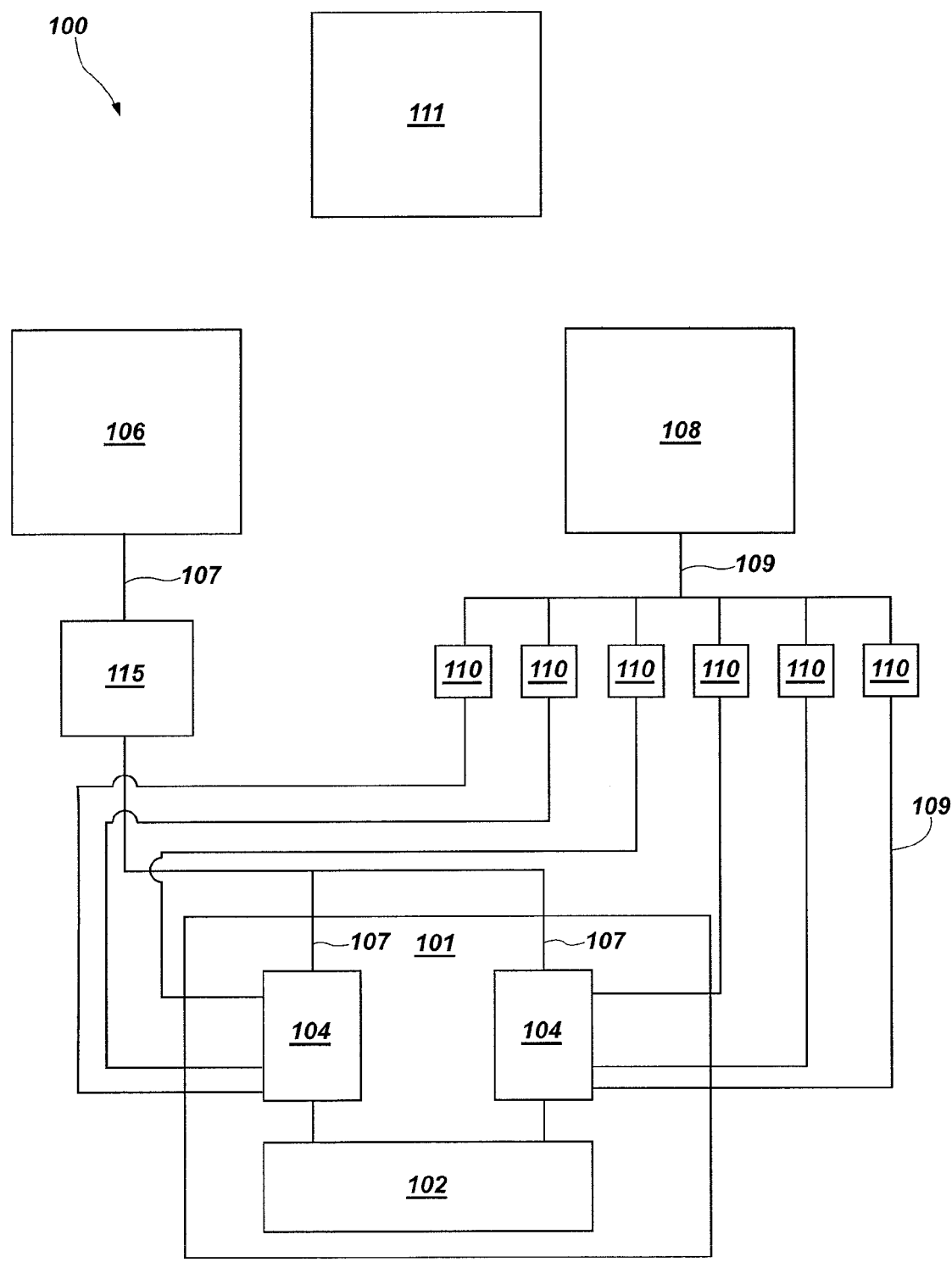
FIG. 1 is a schematic diagram of an embodiment of a molding system of the present disclosure.

FIG. 1 is a schematic diagram illustrating components of a molding system 100 of the present disclosure. As described in further detail below, the molding system 100 includes a molding station 101, a mold 102, a plurality of injection heads 104, and a polymer source 106 that is configured to supply molten polymer to a polymer chamber within each of the injection heads 104. The molding system 100 may include two or more injection heads 104. In the example embodiment disclosed herein, the molding system 100 includes nine injection heads (only two of which are represented in FIG. 1 for simplicity), although the molding system 100 may include any number of injection heads 104 in additional embodiments. The injection heads 104 are described in further detail below with reference to FIGS. 10A-10E. With continued reference to FIG. 1, the molding system 100 may also include at least one pressurized fluid source 108 for supplying a pressurized fluid, such as pressurized hydraulic oil, and one or more selectively actuable flow control valves 110 for selectively controlling flow of the pressurized fluid from the pressurized fluid source 108. A control system 111 may be used to control operation of the various components of the molding system 100.

As shown in FIG. 1, the polymer source 106 may be located remote from the molding station 101 in some embodiments. The polymer source 106 may comprise, for example, an extruder. The extruder may include a cylindrical barrel having a rotating screw therein. Granular polymer material may be fed into the barrel and around the screw. The barrel and/or screw may be heated, and, as the screw rotates within the barrel, the extruder melts, mixes, and pressurizes the thermoplastic material. The polymer source 106 is not limited to such extruders, however, and in additional embodiments, the polymer source 106 may comprise any system or device that is capable of melting, mixing, and pressurizing thermoplastic polymer material.

The molten, pressurized thermoplastic material may be expelled from a forward end of the barrel or other component of the polymer source 106 into a conduit 107, which may convey the pressurized molten thermoplastic material to each of the injection heads 104. The conduit 107 may be heated along the length thereof to prevent solidification of the thermoplastic material therein. In addition, in some embodiments, at least a portion of the conduit 107 may be flexible to allow movement of one or more components to which the conduit 107 is coupled, such as the injection heads 104.

Figure 13:
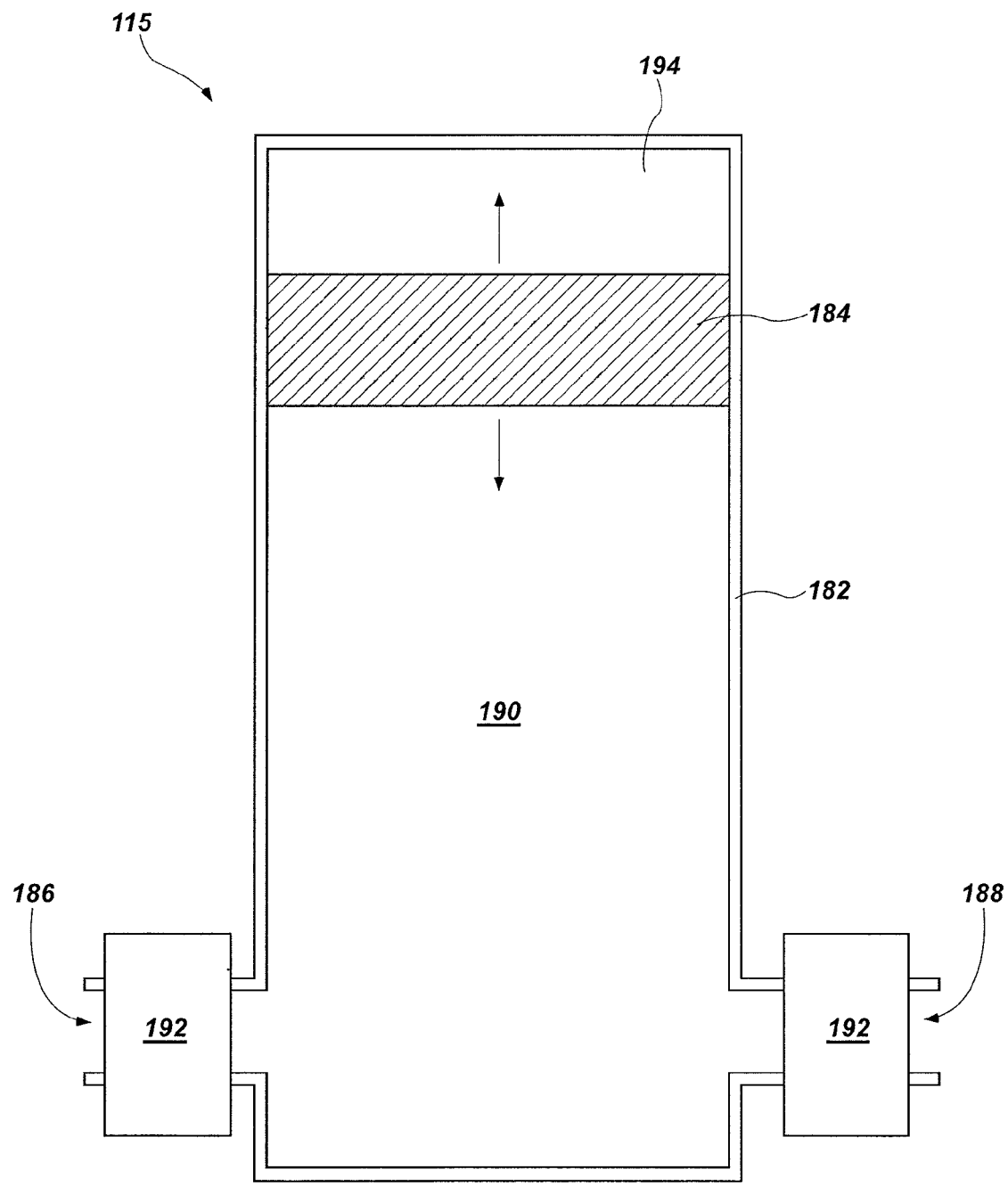
FIG. 13 is a simplified cross-sectional side view of a heated expandable reservoir that may be employed with the molding system of FIGS. 1 through 9.

It may be desirable to reduce wear on the drive mechanism of the extruder of the polymer source 106 by providing a heated expandable reservoir 115 disposed between the polymer source 106 and the plurality of injection heads 104, as shown schematically in FIG. 1. Thus, the conduit 107 may have a first section between the polymer source 106 and the heated expandable reservoir 115, and a second section between the heated expandable reservoir 115 and the plurality of injection heads 104. The heated expandable reservoir 115 may provide a buffer of molten thermoplastic material between injection cycles of the molding system 100. FIG. 13 is a simplified illustration of a non-limiting example of such an expandable reservoir 115. As shown therein, the expandable reservoir 115 may include a cylinder 182 and a piston 184 disposed within the cylinder 182 and configured to slide back and forth within the interior of the cylinder 182. The cylinder 182 may be sealed, and may include an inlet 186 and an outlet 188 to a chamber 190 disposed within the cylinder 182 on a side of the piston 184. Each of the inlet 186 and the outlet 188 may include a one-way check valve 192. In this configuration, molten thermoplastic material may flow into the reservoir 115, and the piston 184 may move to increase the volume of the chamber 190 within the cylinder 182 while the injection heads 104 (FIG. 1) may be injecting molten thermoplastic material into a mold cavity within the mold 102 (FIG. 1) during a molding cycle. After the molding cycle, the piston 184 may move to empty the chamber 190 and assist in filling the injection heads 104 with the molten thermoplastic material (which may be assisted with pressure provided by the extruder). A space 194 on an opposite side of the piston 184 from the molten thermoplastic material optionally may be pressurized with, for example, a pressurized fluid to assist in pressurizing the molten thermoplastic material in the chamber 190. The expandable reservoir 115 may allow the extruder to continue ejecting molten thermoplastic material without significant variations in the pressure of the molten thermoplastic material in the conduit 107 (FIG. 1) adjacent the extruder that might otherwise be caused by operation of the injection heads 104 in the absence of the expandable reservoir 115.

Referring again to FIG. 1, it may be desirable to reduce wear on the motor and/or drive system of the extruder by providing an engageable and disengageable mechanism, such as a clutch, in the drive system of the extruder. By employing such a clutch mechanism in the extruder, rotation of the screw in the extruder may be stopped without shutting down the motor of the extruder. The clutch may include a flywheel clutch mechanism, for example. The clutch mechanism may be a friction plate clutch mechanism, or a hydraulic-based torque converter, and may be configured to allow for relatively quick engagement and disengagement. The electric motor of the extruder thus may be able to continue running at a nearly constant speed, and rotation of the extruder screw may be started and stopped as desirable by engaging and disengaging the clutch mechanism. As another example of an engageable and disengageable drive mechanism that may be employed in the extruder, a pulley tensioner may be used to adjust the tension on a belt or other device coupling rotation of the motor drive shaft to rotation of the extruder screw. The extruder may include a tension pulley between the drive shaft of the motor and a gearbox coupled to the extruder screw. The tension pulley may be provided and configured to engage the gearbox to the drive shaft of the motor, and to disengage the gearbox from the drive shaft of the motor. In this embodiment, the drive motor pulley and the gear box pulley may be spaced at a sufficient distance so that there may be room to add an engagement pulley. This third engagement pulley may be connected to a movable swing arm, and rotation or other movement of the swing arm may cause the engagement pulley to loosen the drive belt(s) between the motor drive shaft and the gearbox to the point that the belt does not couple the rotation of the drive shaft to the gearbox. Then, when it is desired to drive rotation of the screw, the engagement pulley swing arm may be rotated or otherwise moved to the point that the engagement pulley tightens the drive belt(s) so that the motor drives rotation of the gearbox. This swing arm motion may be actuated with a hydraulic, pneumatic, mechanical, or electric motion system.

Unlike standard injection molding machines, the screw of the extruder, which is located remote from the molding station 101, may be decoupled from the molding station 101. Unlike standard injection molding machines in which a screw spins within a barrel to melt material and retracts while doing so and the molten polymer is accumulated in front of the screw at the forward end of the barrel, after which the screw is pushed forward to inject the material, the molding system 100 may use a stand-alone polymer source 106, such as an extruder, which generates molten, pressurized thermoplastic material, which is then supplied to the injection heads 104 through one or more conduits 107. The molten thermoplastic material is received into each of the injection heads 104, after which the injection heads 104 may be actuated to inject the molten thermoplastic material into a mold cavity 103 (FIGS. 11A and 11B) within the mold 102.

The extrusion screw of the polymer source 106 may operate as a separate machine relative to the injection molding station 101, whether or not it is operatively coupled to the molding station 101. The decoupling of the polymer source 106 from the molding station 101 where the injection process is carried out may add flexibility to the layout and utility of the molding system 100. As a separate machine, the polymer source 106 may be modified or replaced with less impact to production time. Also, with the plurality (e.g., nine) of injection heads 104, multiple polymer sources 106 (e.g., extruders) may be employed with the molding system 100 to create a large thermoplastic part with more than one material (for example, a zoned mattress) or to meet other needs.

Figure 5:
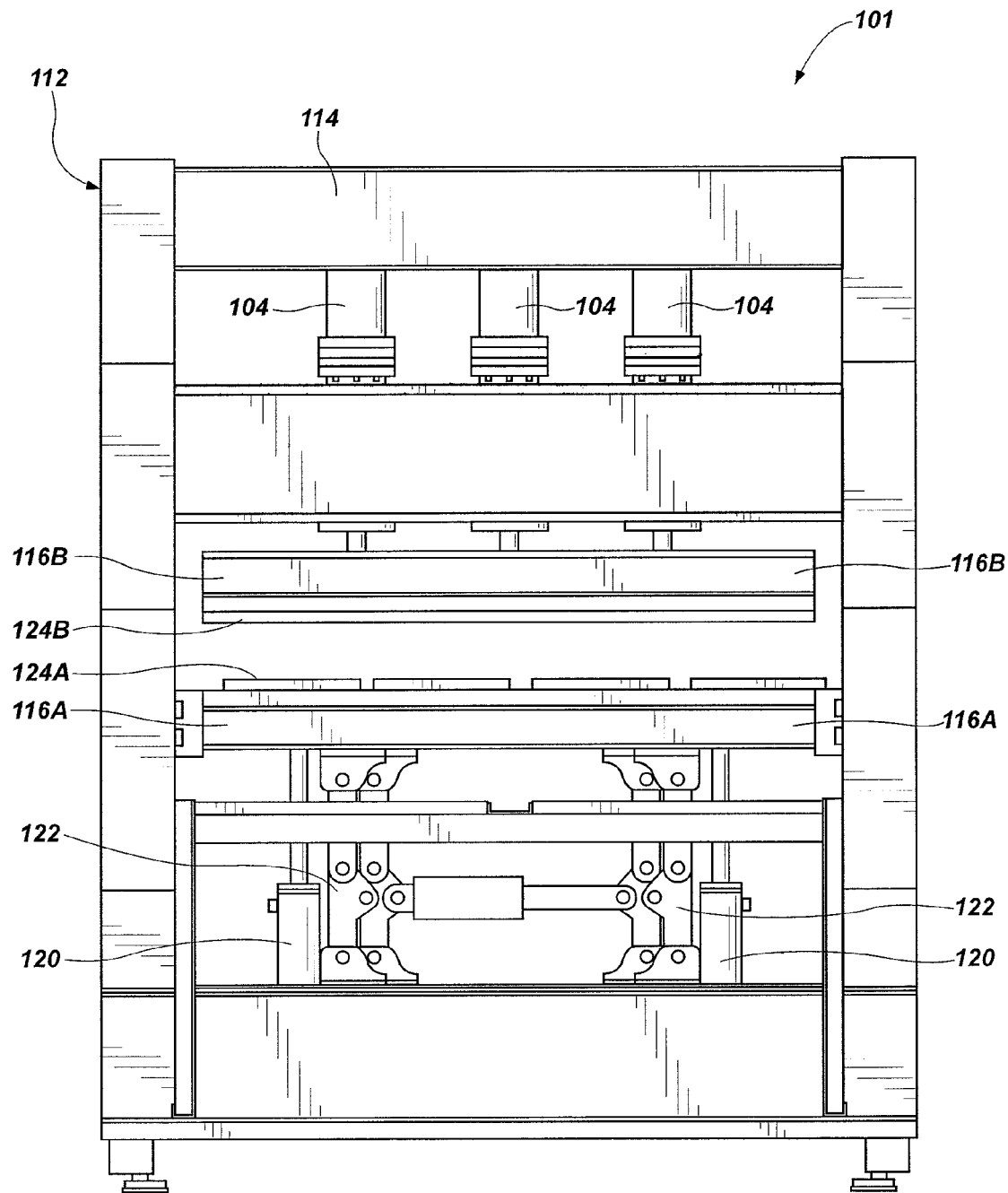
FIG. 5 is a front view of the molding system with the platens in the closed position.

Similarly, the pressurized fluid source 108 may optionally be located remote from the molding station 101. The pressurized fluid source 108 may include, for example, a reservoir for storage of hydraulic oil or other fluid, and one or more hydraulic pumps or other devices for pressurizing the hydraulic oil or other fluid. One or more conduits 107 may be used to convey pressurized fluid from the pressurized fluid source 108 to each of the injection heads 104 (as well as to any other component or system of the molding system 100 that utilizes pressurized fluid for operation, such as, for example, the linear actuators 120 and/or the toggle clamps 122, as shown in FIG. 5). As previously mentioned, selectively actuable flow control valves 110 may be used for selectively controlling flow of the pressurized fluid from the pressurized fluid source 108 to the injection heads 104 and other components. For example, each flow control valve 110 may be disposed between the pressurized fluid source 108 and a respective injection head 104 and configured to selectively control flow of the pressurized fluid from the pressurized fluid source 108 to the respective injection head 104.

FIGS. 2 through 7 illustrate an example of the molding station 101 of the molding system 100. The molding station 101 may comprise a structural frame 112, which may be made of steel beams 114 or other structural members. The beams 114 or other structural members may be welded, bolted, or otherwise permanently or removably fastened together to create the frame 112. The molding station 101 may further include two platens 116A, 116B, which may be permanently or removably mounted to the frame 112. For example, the first platen 116A and the second platen 116B may be oriented horizontally, such that the second platen 116B is located vertically over the first platen 116A. Thus, the two platens 116A, 116B may include a lower platen 116A and an upper platen 116B. The first platen 116A may carry a first mold half 102A (FIGS. 11A and 11B), and the second platen 116B may carry a second mold half 102B. As the platens 116A, 116B are moved toward each other, the mold halves 102A, 102B may come together. The mold halves 102A, 102B have complementary features such that, when the mold halves 102A, 102B are adjoined together, one or more mold cavities are defined within the mold 102 (FIG. 1) between the mold halves 102A, 102B.

The upper second platen 116B may be stationary (although the position thereof may be adjusted), and the lower first platen 116A may be movable. The lower first platen 116A may be moved downwardly away from the upper second platen 116B to open the mold 102, and upwardly toward the upper second platen 116B to close the mold 102.

Although the example embodiment shown in the figures is a vertical injection molding system 100, the molding system 100 may be horizontal or oriented at any angle in additional embodiments.

Additional mold plates or pieces may be added to the mold 102 as desired. For example, the mold 102 may include a part-ejection system comprising one or more ejector pins used to assist in ejecting a molded part from the mold cavity 103 after a molding cycle.

As discussed in further detail below, each of the injection heads 104 may contact the mold 102, such as the mold half 102B, in a plurality of separate locations, and each may inject molten thermoplastic under pressure into the mold cavity 103 or cavities within the mold 102 through a gate (opening) or a gate/runner system (division of flow terminating in a plurality of gates) at each contact point.

A heating system, which may include, for example, heating rods, thermocouple sensors for sensing temperature, and a thermo-controller, may be used to monitor and regulate a temperature of one or more of the mold halves 102A, 102B, as well as any other components of the molding system 100. In some embodiments, temperature regulation plates 124A, 124B may be provided between the platens 116A, 116B and the mold halves 102A, 102B respectively. For example, a first temperature regulation plate 124A may be carried by the first lower platen 116A, and a second temperature regulation plate 124B may be carried by the second upper platen 116B. Heating rods and thermocouple sensors may be disposed within each of the temperature regulation plates 124A, 124B to enable heating of the plates 124A, 124B and monitoring of the temperature of the temperature regulation plates 124A, 124B. In other embodiments, fluid conduits may be used to convey cooling or heating fluid through the temperature regulation plates 124A, 124B to control the temperature thereof. The mold halves 102A, 102B may be heated or cooled by their physical contact with the temperature regulation plates 124A, 124B in some embodiments.

In some embodiments, the molding system 100 (FIG. 1) may include a plurality of linear actuators 120 and a plurality of toggle clamps 122, which may be configured to work together to move the lower first platen 116A toward and away from the upper second platen 116B. In particular, the linear actuators 120 may provide a majority of the force causing the initial vertical movement of the lower first platen 116A in the upward direction toward the upper second platen 116B. The toggle clamps 122 may provide a majority of the force causing the final vertical movement of the lower first platen 116A in the upward direction toward the upper second platen 116B, and, as the mold half 102A abuts against the mold half 102B, the toggle claps 122 may lock into the position in which they remain during the molding cycle. In other words, the toggle clamps 122 may provide a locking mechanism that locks the platens 116A, 116B (and hence the mold halves 102A, 102B) in position during the pressurized injection of the molten thermoplastic into the mold cavity 103 (FIGS. 11A and 11B) within the mold 102. Due to the configuration of the toggle clamps 122, the mechanical advantage of the toggle clamps 122 may be low in the initial stage of movement of the platen 116A, but high in the final stage of movement of the platen 116A. Thus, the linear actuators 120 may be used to assist movement of the platen 116A in the initial stage of movement of the platen 116A where the mechanical advantage of the toggle clamps 122 is low.

Figure 6:
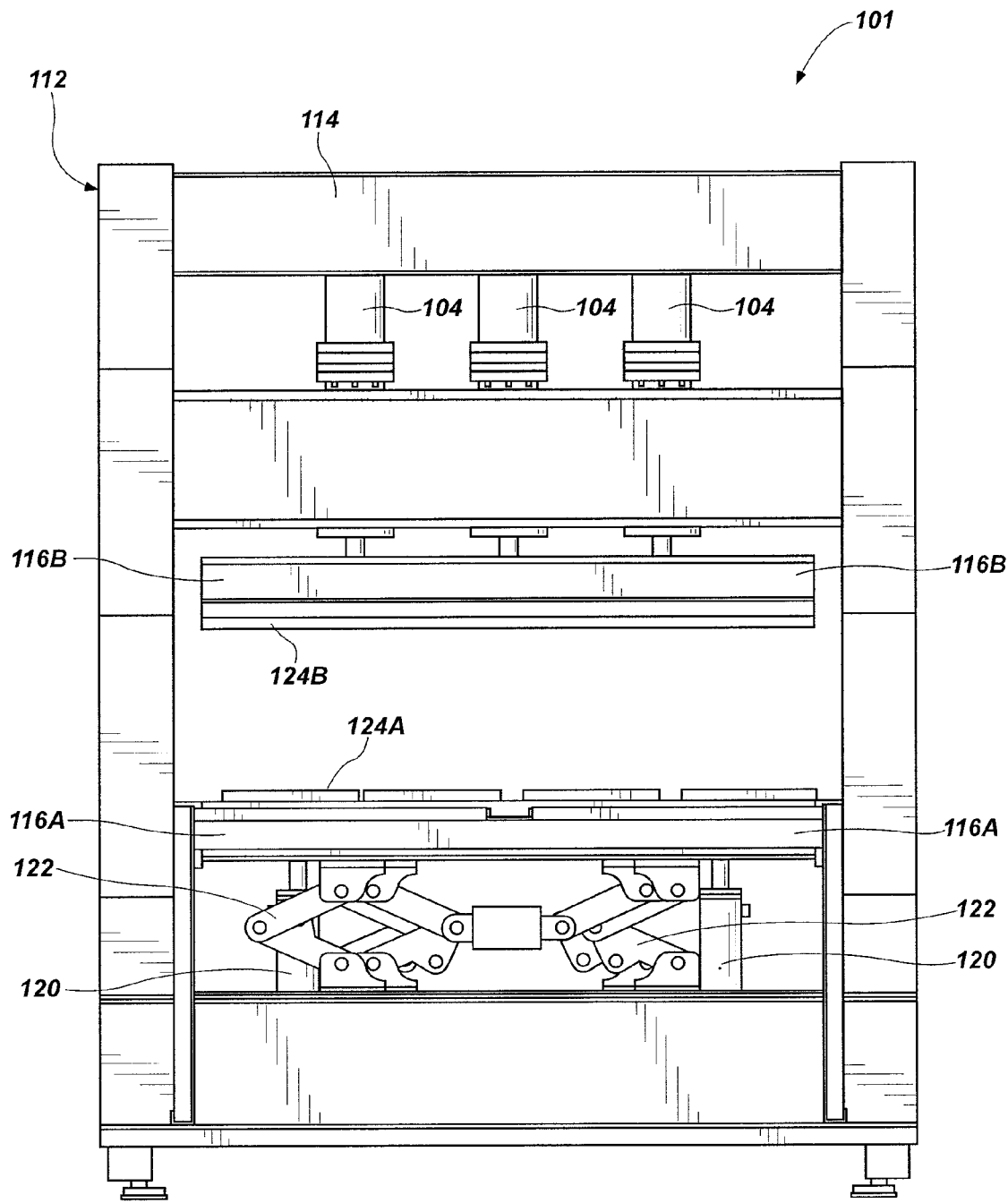
FIG. 6 is a front view like that of FIG. 5 illustrating the platens in the open position.
Figure 7:
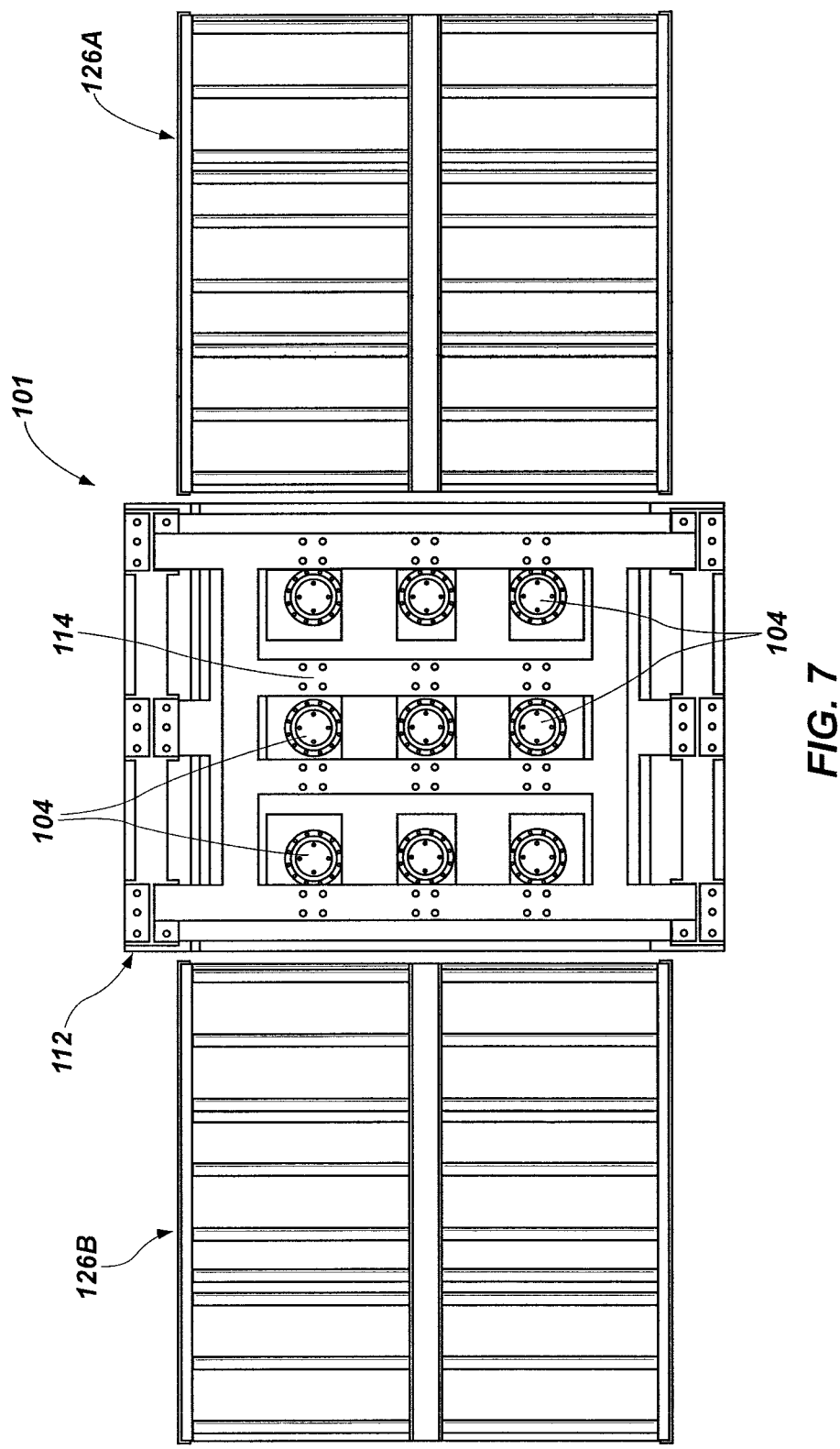
FIG. 7 is a top view of the molding system shown in FIGS. 2 through 6.
Figure 8:
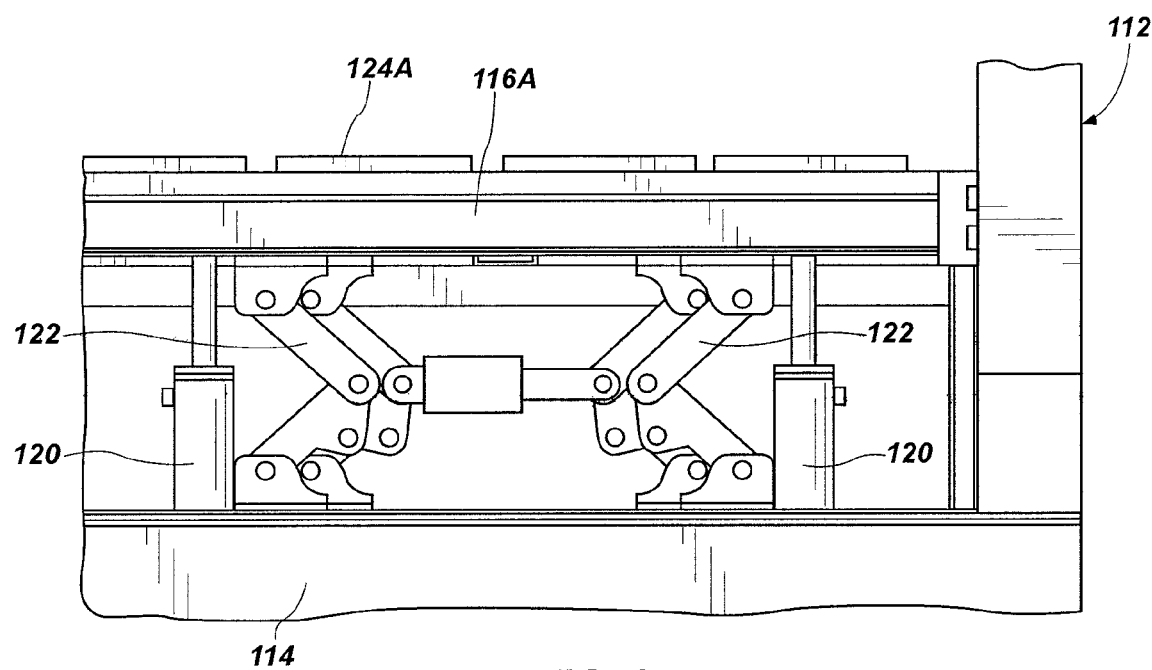
FIG. 8 is an enlarged partial front view of the molding system illustrating a combination toggle/straight-push hydraulic system used to move a platen of the molding system of FIGS. 1 through 7.
Figure 9:
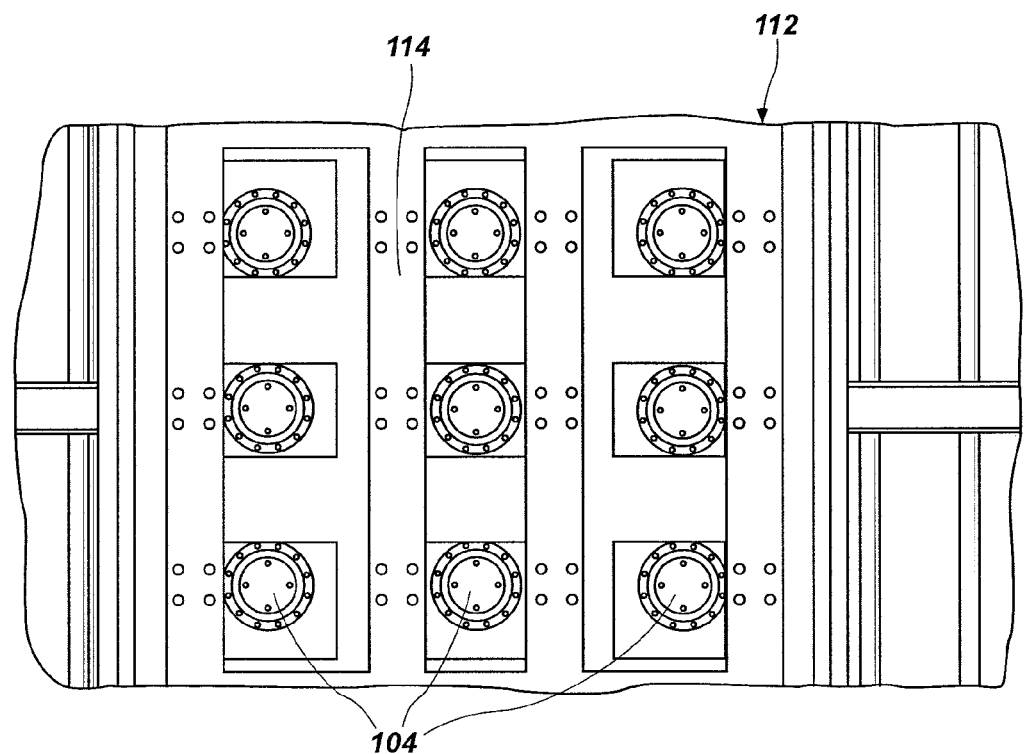
FIG. 9 is an enlarged view of a portion of FIG. 7 illustrating the layout of the nine injection heads of the molding system.

The toggle clamps 122 are more clearly illustrated in FIGS. 5 and 6, which show the platens 116A, 116B in the closed and open positions, respectively. The example embodiment shown in the figures includes six toggle clamps 122 spaced and located in an array under the lower platen 116A. The bottoms of the toggle clamps 122 bear against the structural frame 112 of the molding station 101, and the tops of the toggle clamps 122 bear against the lower platen 116A.

Conventional molding systems typically employ either a single large straight push hydraulic ram or a toggle clamp system, but do not typically employ both a linear actuator 120 and a toggle clamp 122. As a non-limiting example, the molding system 100 (FIG. 1) may have four medium sized straight-push linear actuators 120 (e.g., hydraulic cylinders) that lift the lower platen 116A in the upward direction to close the mold 102. At the same time that these four linear actuators 120 are closing the mold 102 (FIG. 1), the toggle clamps 122 may act to close the mold 102. The toggle clamps 122 may be arranged in pairs, with a linear actuator coupled between the elbows of toggle clamp 122 in the pair. The linear actuators of the toggle clamps 122 may be similar to the linear actuators 120, but may be oriented transversely to the linear actuators 120. The linear actuators of the toggle clamps 122 may also be hydraulic cylinders. As previously mentioned, when the mold 102 is completely closed, the toggle clamps 122 may lock in place and hold the mold 102 firmly in the closed position. This hybrid clamping system may make the clamping of molds 102 function in such a way as to allow full clamping rigidity with the toggle clamp 122 system, but may enable relatively large-scale motion at the open end of each stroke using the linear actuators 120, resulting in relatively smaller mechanical and hydraulic componentry relative to previously known systems.

In some embodiments, two or more lower first mold halves 102A may be employed, each of which first mold half 102A may be at least substantially identical to the other of first mold halves 102A. A plurality of first mold halves 102A may be employed so that, while a first lower mold half 102A is adjoined to the single second mold half 102B and being filled with molten thermoplastic to form a first molded article, a second lower mold half 102A may be in an accessible position for a second, previously molded article to be removed from the second lower mold half 102A. In the next subsequent molding cycle, the second lower mold half 102A may move back into molding position and abutted against the single upper mold half 102B while the first lower mold half 102A moves to an accessible location for removal of a molded part from the first lower mold half 102A. The two lower mold halves 102A may thus be shuttled back and forth. More than two lower mold halves 102A may be utilized if extraction of molded parts from the lower mold halves 102A requires more time than the molding process itself (injection of molten thermoplastic into the mold cavity 103 and cooling and solidification of the thermoplastic material within the mold cavity 103).

A first roller table 126A may be located adjacent the frame 112 on the right of the frame 112, and a second roller table 126B may be located adjacent the frame 112 on the left of the frame 112. When the first of two lower mold halves 102A is on the lower platen 116A and engaged with the upper mold half 102B, the second lower mold half 102A may be on the left roller table 126B. The top of the second lower mold half 102A may be exposed to facilitate easy removal of the thermoplastic part from the mold cavity 103 (FIGS. 11A and 11B) therein, either by an operator or by another means, such as a robot. When the platens 116A, 116B separate and the first lower mold half 102A disengages from the upper mold half 102B, another thermoplastic part may be in or on the first lower mold half 102A. The second lower mold half 102A may be moved onto the lower platen 116A and under the upper mold half 102B simultaneously with movement of the first lower mold half 102A (with the molded part thereon) off from the lower platen 116A out from under the upper mold half 102B and onto the first roller table 126A on the right side of the frame 112. In additional embodiments, the movement may not be simultaneous, but rather sequential. For example, the first lower mold half 102A may be moved off from the lower platen 116A and onto the first roller table 126A on the right side of the frame 112, after which the second lower mold half 102A may be moved from the second roller table 126B on the left side of the frame 112 onto the lower platen 116A for a molding cycle. During the molding cycle, a molded part may be removed from the first lower mold half 102A. After the molding cycle, the process may be reversed. In this manner, the two lower mold halves 102A may move back and forth to the left and right roller tables 126A, 126B while their counterpart B plate may be joining with the A plate to mold a part.

Figure 2:
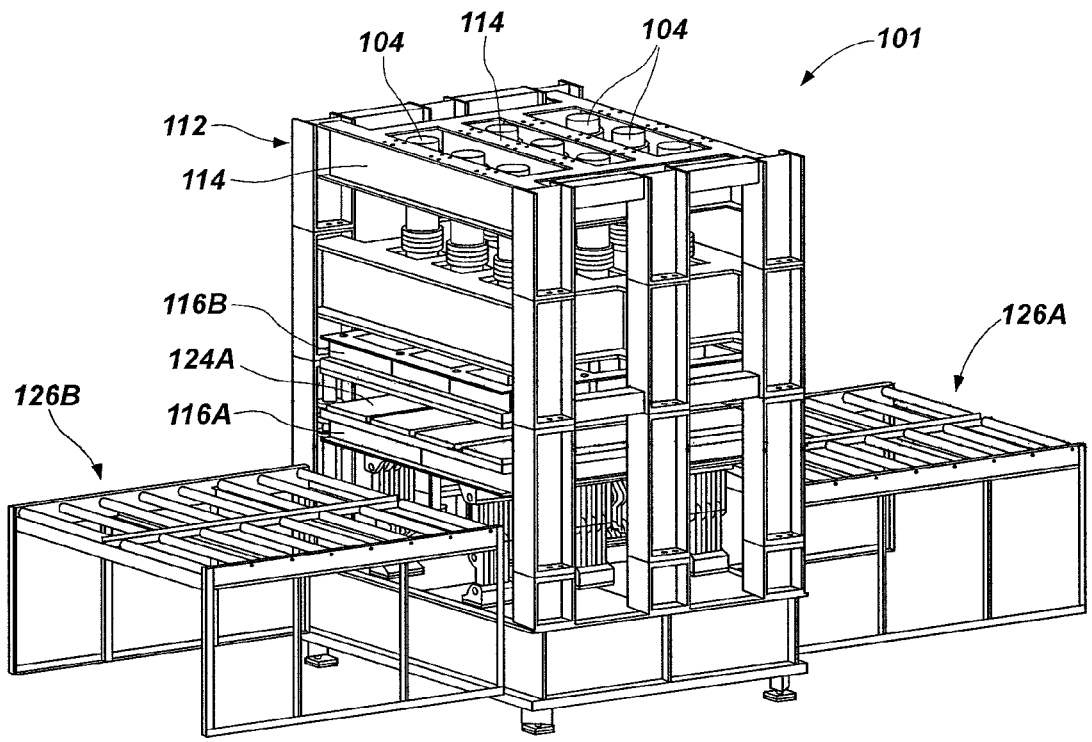
FIG. 2 is an isometric view of components of the molding system of the present disclosure illustrating platens thereof in a closed position.
Figure 3:
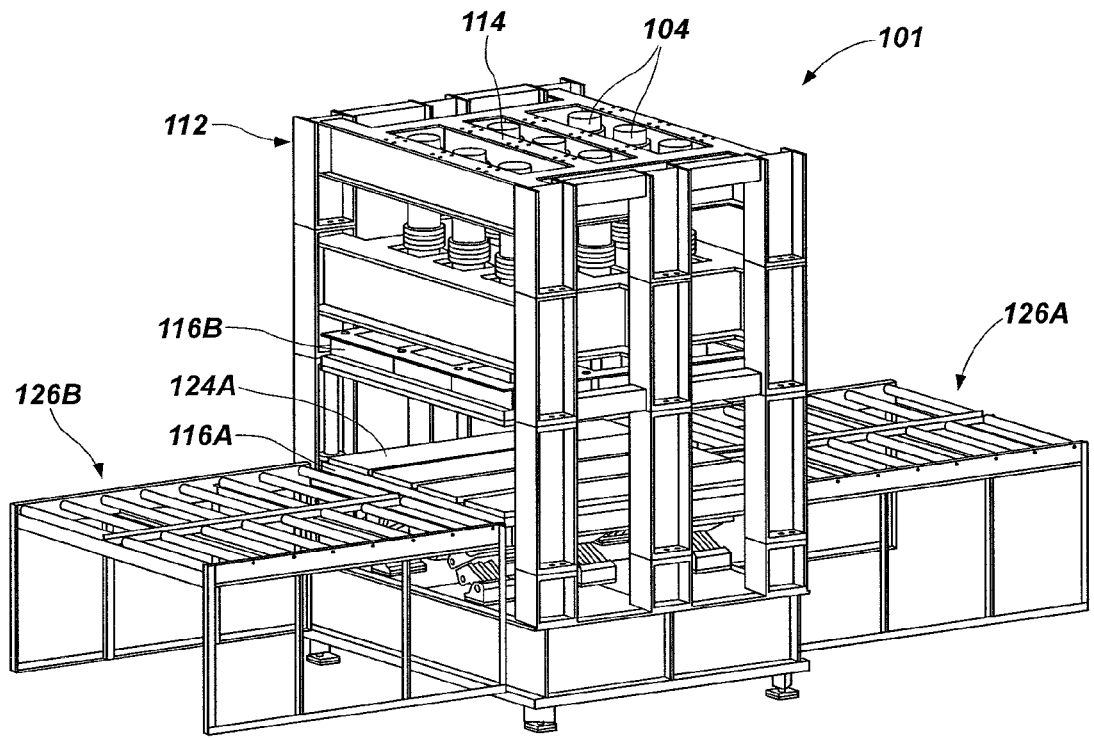
FIG. 3 is an isometric view like that of FIG. 2 illustrating platens thereof in an open position.
Figure 4:
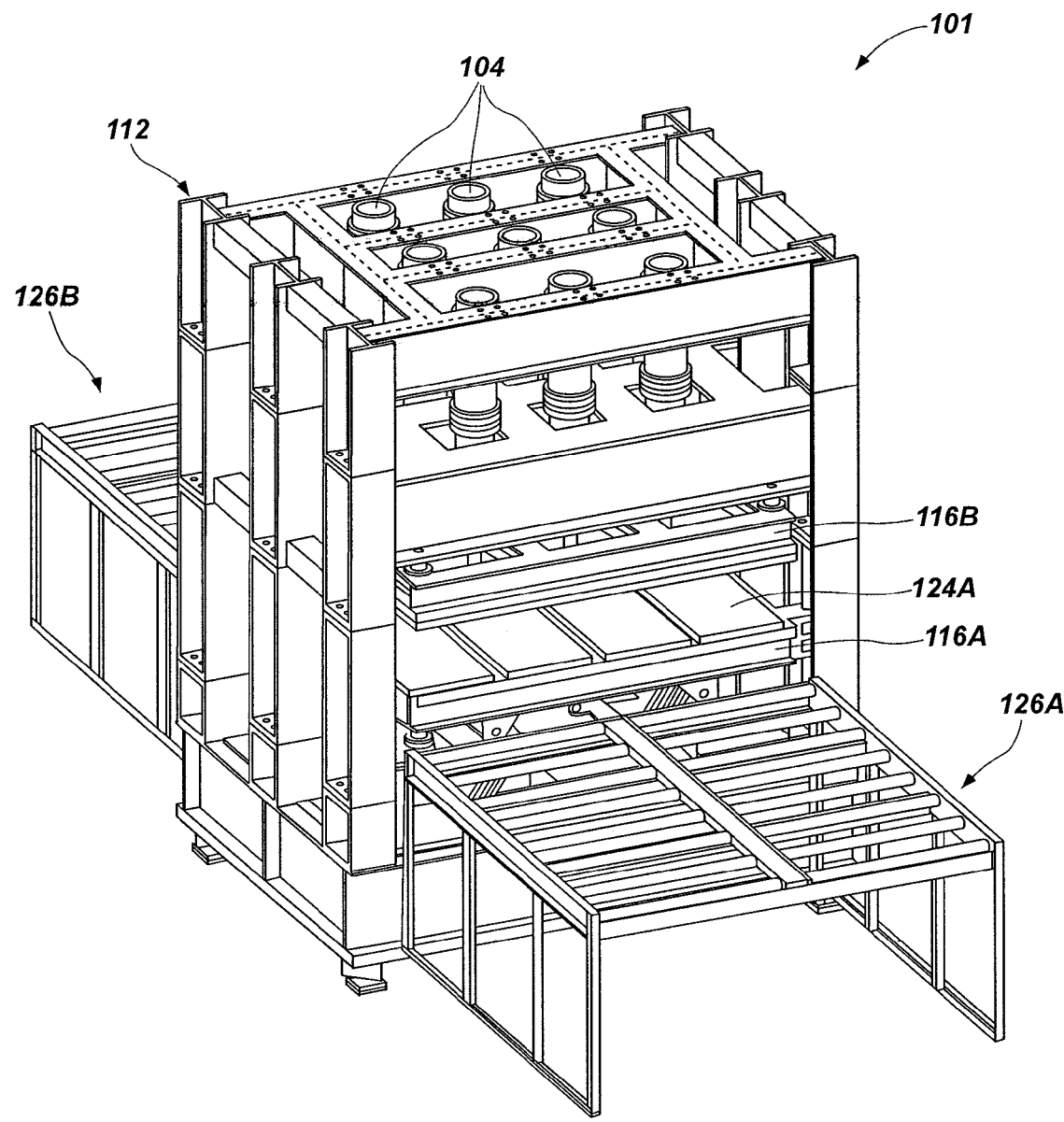
FIG. 4 is an isometric view of the molding system of FIGS. 2 and 3 from a different viewing perspective and illustrating the platens in the position midway between the open position and the closed position.

FIGS. 2 through 7 are various views of the molding station 101 of the molding system 100 (FIG. 1). Illustrated in FIGS. 2 through 7 are the injection heads 104, the lower and upper platens 116A, 116B, the temperature regulation plates 124A, 124B, the toggle clamps 122, and the linear actuators 120. FIGS. 2 and 5 illustrate the lower and upper platens 116A, 116B in the closed position. While the mold 102 is not shown in FIGS. 2 through 7, the mold halves 102A, 102B (FIGS. 11A and 11B) would be fully closed and in contact with one another when the platens 116A, 116B are in the closed position shown in FIGS. 2 and 5, and the toggle clamps 122 are fully extended and locked. FIGS. 3 and 6 show the lower and upper platens 116A, 116B in the open position. The mold halves 102A, 102B would be open and pulled apart from one another when the platens 116A, 116B are in the open position shown in FIGS. 3 and 6, and the toggle clamps 122 are unlocked and partially or fully bent. The upper mold half 102B of the mold 102 may attach to the upper platen 116B with bolts or other fasteners, and the lower mold half 102A of the mold 102 may attach to the lower platen 116B, or (especially when multiple lower mold halves 102A are employed) may be temporarily located on the lower platen 116A without fastening using bolts or other fasteners, and the lower mold half 102A may be pushed into place against the upper mold half 102B by the lower platen 116A.

The example embodiment of the molding system 100 includes nine separate injection heads 104 mounted to the structural frame 112 at locations above the upper platen 116B. The injection heads 104 are located in an array of three rows and three columns. The spacing of this array may be uniform as shown in the figures. In other embodiments, the molding system 100 may include any number of injection heads 104 (e.g., two or more), and the injection heads 104 may be located at any desirable positions relative to the mold 102 being employed. In addition, the number and locations of the injection heads 104 may be changed from time-to-time for use with different molds 102 for fabrication of different thermoplastic articles of manufacture.

Figure 11A:
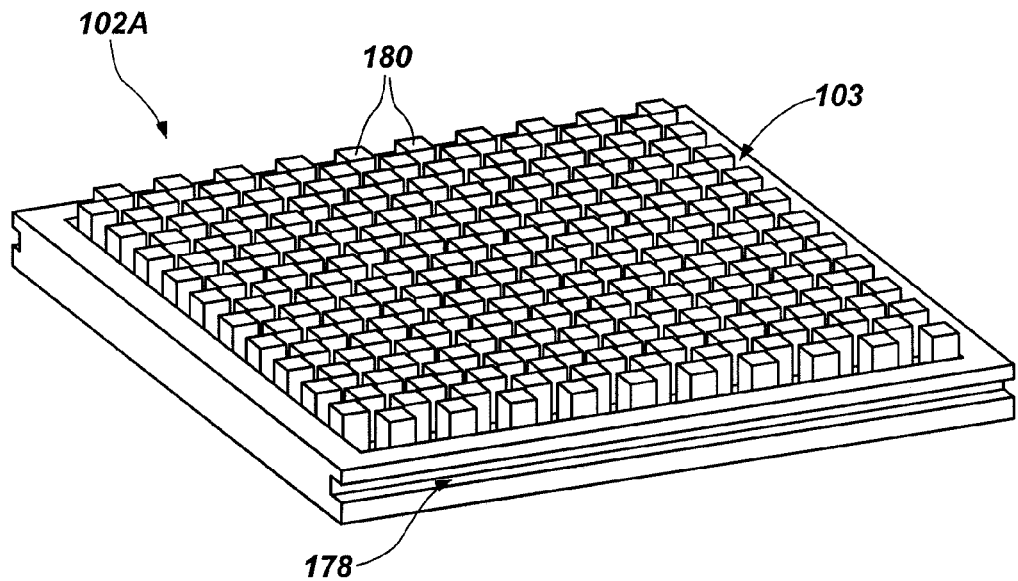
FIG. 11A is an isometric view of an example of a mold that may be employed with the molding system.
Figure 11B:
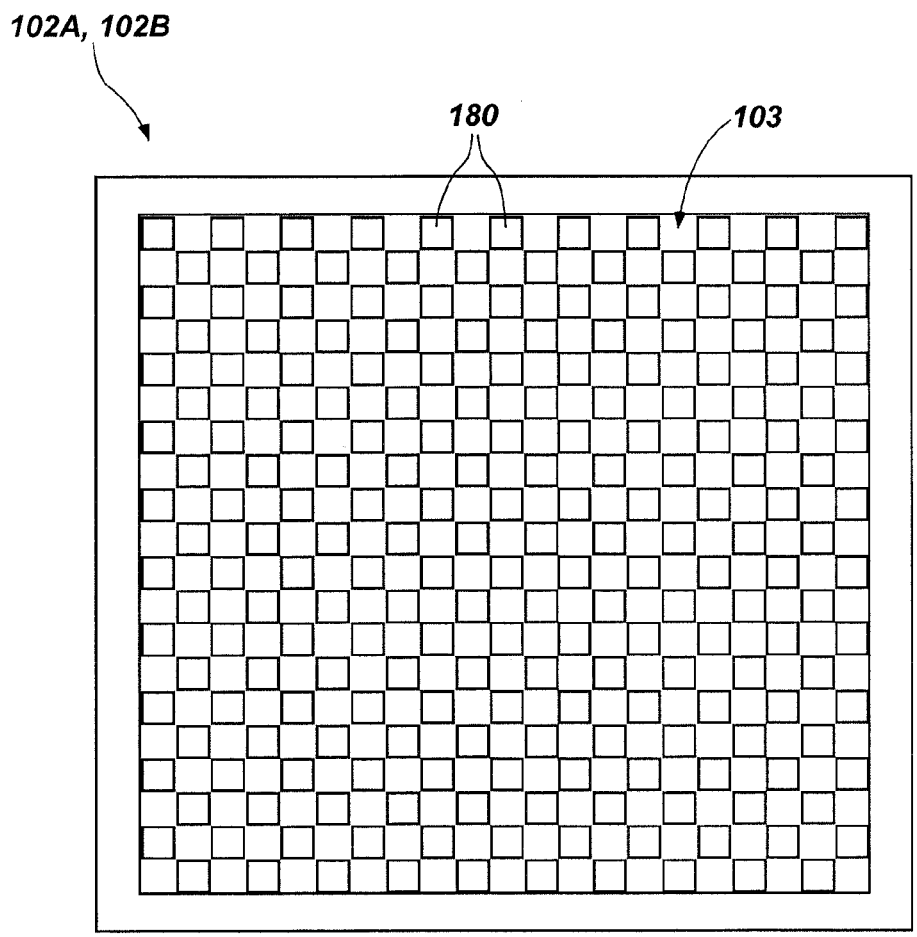
FIG. 11B is a plan view of the mold of FIG. 11A.

Each injection head 104 may be centered over a gate of the mold 102. As known in the art of injection molding, the mold 102 may include a "runner" system comprising pathways through which the molten thermoplastic material may flow from the gates to the mold cavity 103 (FIGS. 11A and 11B). In the example embodiment of the molding system 100 shown in the figures, which is configured to make a king-size mattress made from buckling thermoplastic gelatinous elastomer such as described in U.S. Pat. Nos. 5,749,111 and 6,026,527, the disclosures of which are incorporated herein by in their entireties by this reference, the second upper mold half 102B of the mold 102 may have nine gates uniformly spaced in an array corresponding to the array of the injection heads 104. The upper platen 116B also may have recesses into and through which the lower portions of the injection heads 104 may extend so as to enable nozzles of the injection heads 104 to directly, respectively contact the second upper mold half 102B at the nine uniformly spaced gates of the mold half 102B.

In this particular embodiment, the melted thermoplastic supplied by the polymer source 106 is injected into the mold 102 from nine separate injection heads 104 spaced evenly in an ordered array across the upper platen 116B. In typical injection molding, not only is the injection system quite different than the injection heads 104 described herein, but only one injection system is typically used in previously known systems. In typical injection molding systems, a screw and barrel are used as an injection ram to push the molten plastic into the mold. The screw and ram are typically located at the center of one platen. Occasionally, a typical injection molding may include two such screw and barrel assemblies to mold parts made of two different materials in a process called co-molding, but they do not employ a plurality of injection heads to inject identical material to achieve the benefits described herein.

In embodiments of the present disclosure, multiple injection heads 104 (e.g., nine) are used to inject material, which may be the same material and may be supplied from a common polymer source 106, at different locations in the mold 102. Each of the injection heads 104 may be controlled independently. The independent control of the injection heads 104 may allow for the injection speed, timing, and pressure to be controlled separately for each of the injection heads 104. This allows the operator to be able to uniquely optimize the injection cycle for each individual mold 102 and part molded therein. In some molds, it may be preferable to inject molten thermoplastic material into a center of the mold cavity 103 using one injection head 104 prior to commencing injection of molten thermoplastic material into other peripheral areas of the mold cavity 103 using additional injection heads 104. In this manner, the flow of the molten thermoplastic material within the mold cavity 103, from the center thereof to the outer periphery of the mold cavity 103, may be boosted with additional localized injections as the flow front spreads across the mold cavity 103.

It may be difficult, if not impossible, to injection mold certain large parts with only a single injection point per material (as in previously known systems), because there may be a practical limit as to how far a molten material may flow within the mold cavity 103 before the thermoplastic material cools and solidifies.

In other molds 102 and for other types of articles to be molded therein, each of the plurality of injection heads 104 may be actuated concurrently and simultaneously in a given molding cycle. In such cases, the molten thermoplastic material need flow within the mold cavity 103 only until it meets the flow front from another injection head 104 or until it reaches the a boundary (e.g., a peripheral edge) of the mold cavity 103. Thus, much larger parts may be molded using this multi-injection head 104 system relative to previously known injection molding systems of comparable size.

An advantage of the multiple injection heads 104 of the molding system 100 described herein is that the multiple injection heads 104 may, at least in some embodiment, be individually controllable for enhancement (e.g., optimization) of the flow of the molten thermoplastic material within the mold cavity 103 during the molding cycle. Parameters that may be individually controlled for each injection head 104 include, for example, temperature (and, correspondingly, melt flow viscosity of the polymer), injection pressure vs. time, injection speed vs. time, shot size (i.e., volume of injected material per injection cycle), and timing of commencement of injection relative to the commencement of injection by other injection heads 104.

The control system 111 (FIG. 1) of the molding system 100 may be used to control operation of each injection head 104 independently. The control system 111 of the molding system 100 may be configured to control all of the operations of each of the injection heads 104 independently. The injection heads 104 may be able to be turned off and locked closed when desired, such as when molding parts that may be too small to need injection from all of the injection heads 104. The number and location of the injection heads 104 employed in conjunction with any particular mold 102 may be customized to assist in avoiding air bubbles in the molded articles, completely filling the mold 102, reducing the total clamping pressure required to maintain the mold 102 closed during a molding cycle, reducing material degradation, and/or avoiding weak knit lines in the cooled thermoplastic material of the molded article.

It may be desirable to sense the location of the lower mold half or halves 102A of the mold 102, especially when multiple lower mold halves 102A are employed as previously described. The movable lower mold halves 102A may be slid and/or rolled out of the molding area after each injection cycle, and then subsequently slid and/or rolled back into the molding position after the molded part is extracted from the mold cavity 103. One or more sensors may indicate to the control system 111 when a lower mold half 102A is in position for a molding cycle over the lower platen 116A before the platen 116A and the lower mold half 102A are raised to close the mold 102 for a molding cycle. Proximity sensors may be used, such as may be used in vacuum fill hopper systems for feeding pellets of polymer into polymer processing machines. Micro-switches may be used in additional embodiments. As a non-limiting example, a series of three location sensors (for example, proximity, magnetic or micro switches) may detect the position of the lower mold half 102A as the lower mold half 102A moves onto the lower platen 116A. Upon tripping the first sensor, the speed of the movement of the lower mold half 102A may be slowed by the control system 111. Upon tripping the second sensor, the speed of the movement of the lower mold half 102A may be further slowed by the control system 111. As the lower mold half 102A trips the last sensor, movement of the lower mold half 102A may be halted and the lower mold half 102A may be in the molding position on the lower platen 116A. Such a progressive sensor array may allow the lower mold halves 102A to be moved relatively quickly for reduced molding cycle time, while preventing damage to the lower mold halves 102A.

Figure 10A:
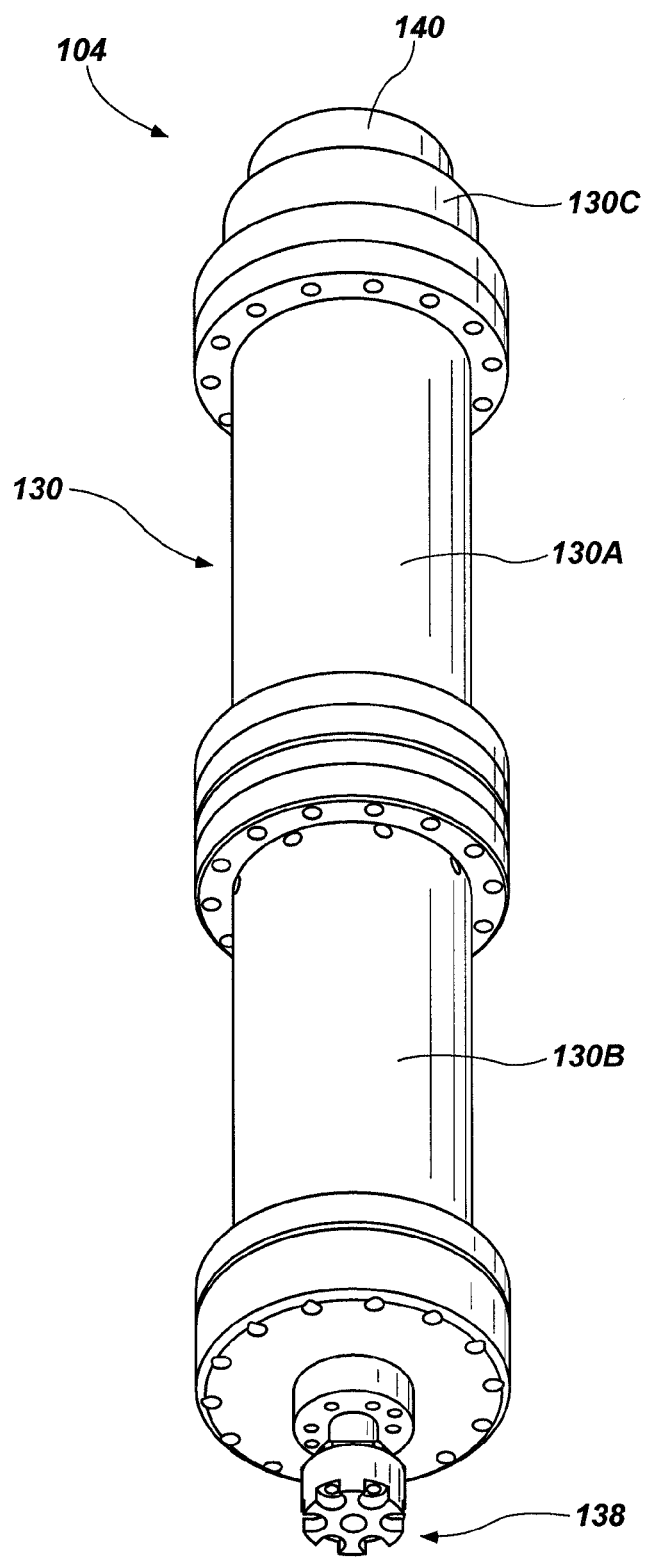
FIG. 10A is an isometric view of one injection head of the molding system of FIGS. 1 through 7.

FIGS. 10A-10E illustrate an example embodiment of an injection head 104 of the molding system 100 (FIG. 1). The other injection heads 104 of the molding system 100 may be substantially identical to that shown in FIGS. 10A-10E. Referring to FIG. 10B, each injection head 104 may include an outer body 130 and a piston 132 disposed within the outer body 130. A polymer chamber 134 may be defined on a first side of the piston 132 within the outer body 130, and a pressure chamber 136 may be defined on an opposite second side of the piston 132 within the outer body 130. The piston 132 is configured to move back and forth within the outer body 130 between a retracted position (shown in FIGS. 10B and 10C) and an extended position (shown in FIGS. 10D and 10E). The piston 132 is configured to move from the retracted position to the extended position responsive to pressurization of the pressure chamber 136. Each injection head 104 further includes a nozzle 138 through which molten polymer is injected from the polymer chamber 134 into the mold cavity 103 within the mold 102 during a molding process. In addition, each injection head 104 may include a mounting member 140 configured to be coupled to the frame 112 (FIGS. 2-7) in a fixed position. The outer body 130 of each injection head 104 may be coupled to the mounting member 140 and configured to move between an extended position (shown in FIGS. 10C and 10D) and a retracted position (shown in FIGS. 10B and 10E) relative to the mounting member 140.

The pressure chamber 136 may be a hydraulic pressure ram, and may be plumbed to be a dual-acting cylinder or a single-acting cylinder. As shown in FIGS. 10B-10E, the pressure chamber 136 is a single-acting cylinder. In particular, the injection head 104 includes a single hydraulic fluid inlet 142 through which pressurized hydraulic fluid may flow to generate a force on the piston 132 and force the piston 132 in the direction causing expulsion of molten thermoplastic material out from the polymer chamber 134 through the nozzle 138. In embodiments in which the pressure chamber 136 is a dual-acting cylinder, an additional hydraulic fluid inlet may be provided through which pressurized hydraulic fluid may flow into the space 144B to generate an opposite force on the piston 132 and force the piston 132 in the opposite direction, which may assist in drawing additional molten thermoplastic material into the polymer chamber 134 from the polymer source 106 (FIG. 1). In the dual-acting mode, the injection head 104 may be capable of drawing molten thermoplastic material into the polymer chamber 134 from the polymer source 106 at a relatively faster rate. In such a dual-acting mode, however, air may be inadvertently drawn into the polymer chamber 134 with the molten polymer material, which may cause molding problems, such as short shots and/or air bubbles in the molded article. In the single-acting mode, the molten thermoplastic material 146 may push the piston 132 in the direction enlarging the polymer chamber 134 and shrinking the pressure chamber 136 as the molten thermoplastic material 146 is forced into the polymer chamber 134 through a polymer inlet 148. The single-acting mode may be relatively less likely to result in the inadvertent accumulation of air bubbles in the molten thermoplastic material 146 within the polymer chamber 134.

Each injection head 104 may include a check valve 149 (FIGS. 10D and 10E) at the polymer inlet 148 through which molten thermoplastic material 146 is received into the polymer chamber 134 under pressure from the polymer source 106 (FIG. 1). The check valve 149 may preclude back flow of the molten thermoplastic material 146 from the injection head 104 out through the polymer inlet 148 during an injection cycle. The check valve 149 may include an annular ring disposed in an annular space within the injection head 104. The annular ring and the annular space may be configured such that, when the annular ring is pushed upward within the annular space, an annular flow path is provided around the annular ring from the polymer inlet 148 into the polymer chamber 134, but also such that, when the annular ring is pushed downward within the annular space, a seal is established between the ring and other complementary surfaces of the injection head 104 such that backflow of molten thermoplastic material 146 past the annular ring to the polymer inlet 148 is precluded. Thus, in this configuration, the check valve 149 allows pressurized molten thermoplastic material 146 to fill the polymer chamber 134 in the injection head 104, but precludes the flow of the molten thermoplastic material 146 in the reverse direction back out of the injection head through the polymer inlet 148 and toward the polymer source 106.

With continued reference to FIGS. 10A-10E, the piston 132 of each injection head 104 may include a first piston member 150, a second piston member 152, and a rod 154 extending between and coupled to each of the first piston member 150 and the second piston member 152. The polymer chamber 134 may be disposed within the outer body 130 between the first piston member 150 and the nozzle 138, on the side of the first piston member 150 opposite the rod 154. The pressure chamber 136 may be disposed on the side of the second piston member 152 opposite the rod 154. Thus, an annular space 144 may also be defined within the outer body 130 around the rod 154 between the first piston member 150 and the second piston member 152. Optionally, a sealing disk 156 may be disposed within the outer body 130 that seals against the rod 154 and divides the space 144 into a first space 144A between the sealing disk 156 and the first piston member 150, and a second space 144B between the sealing disk 156 and the second piston member 152. In some embodiments, the outer body 130 may include a first tubular member 130A, and a second tubular member 130B coupled together end-to-end with the sealing disk 156 therebetween, as shown in FIGS. 10B-10E, to form the outer body 130.

When the pressure chamber 136 is pressurized with fluid supplied from the pressurized fluid source 108 (FIG. 1), the piston 132 may slide within the outer body 130 toward the nozzle 138, such that the first piston member 150 forces the melted thermoplastic within the polymer chamber 134 out through the nozzle 138 and into the mold cavity 103 (FIGS. 11A and 11B). This use of combination cylinders may reduce the footprint of the molding station 101 (FIG. 1) as well as the height of the molding station 101. Instead of separate cylinders that must be coupled by a separate mechanism, both the pressure chamber 136 and the polymer chamber 134 may be combined into one cylinder (e.g., the outer body 130).

Figure 10D:
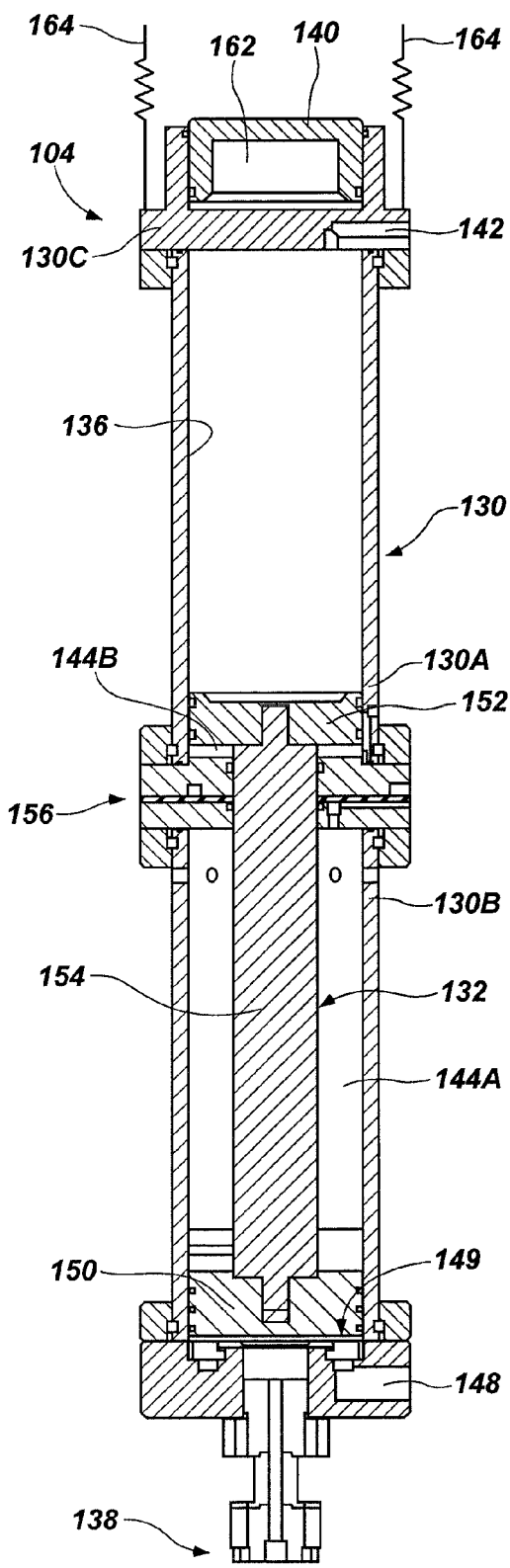
FIG. 10D is a cross-sectional side view like those of FIGS. 10B and 10C illustrating the body of the injection head in the extended position relative to the mounting member of the injection head and after a piston has expelled the molten polymer from the injection head and into a mold during a molding cycle.
Figure 10E:
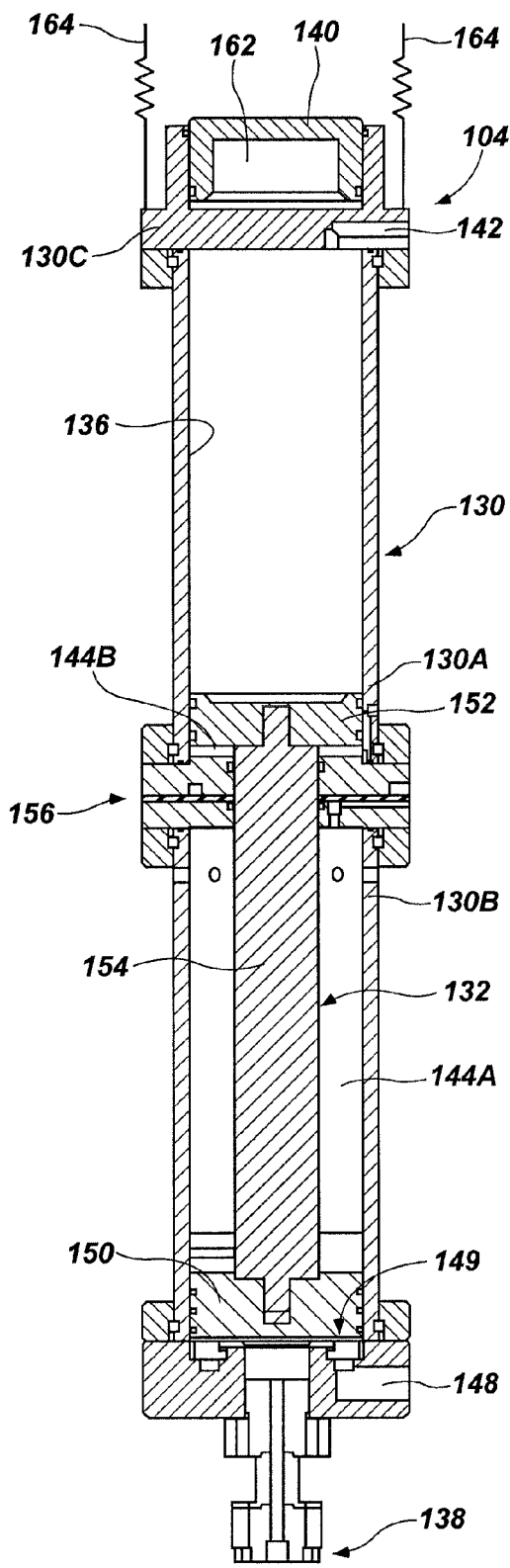
FIG. 10E is a cross-sectional side view like those of FIGS. 10B-10D illustrating the body of the injection head returned to the retracted position relative to the mounting member of the injection head upon completion of a molding cycle.

With continued reference to FIGS. 10B-10E, each of the injection heads 104 may also comprise a mounting member 140 configured to be coupled to the frame 112 (FIGS. 2-7) of the molding station 101 (FIG. 1) in a fixed position. For example, bolts or other fasteners may be used to affix the mounting member 140 to the frame 112. The injection head 104 may be suspended under a beam of the frame 112 by the mounting member 140. The outer body 130 of each injection head 104 may be coupled to the mounting member 140 thereof and configured to move between an extended position (as shown in FIGS. 10C and 10D) and a retracted position (as shown in FIGS. 10B and 10E) relative to the mounting member 140. For example, the outer body 130 may also include a relatively short stroke secondary cylinder 130C. The mounting member 140 may be or include a piston disposed within the secondary cylinder 130C, such that an additional pressure chamber 162 is defined within the injection head 104 between the mounting member 140 and the secondary cylinder 130C. Pressurization of the additional pressure chamber 162 with pressurized fluid, which may be supplied from the pressurized fluid source 108 (FIG. 1) and controlled with a selectively actuable flow control valve 110 (FIG. 1), may cause the outer body 130 of the injection head 104 to move from the retracted position (of FIGS. 10B and 10E) to the extended position (of FIGS. 10C and 10D). One or more biasing members 164 may be located and configured to bias the outer body 130 of the injection head 104 to the retracted position relative to the mounting member 140, as shown in FIGS. 10B and 10E. The biasing members 164 may comprise, for example, springs having a first end coupled to the frame 112 (FIGS. 2-7) and a second end coupled to the outer body 130. Thus, the springs may pull the outer body 130 in the upward direction (from the perspective of the figures) toward the member of the frame 112 to which it is attached. Pressurization of the additional pressure chamber 162 may overcome the biasing force of the biasing members 164 and force the outer body 130 to the extended position relative to the mounting member 140, as shown in FIGS. 10C and 10D.

Each injection head 104 may have, for example, three to four springs or other biasing members 164. Each injection head 104 may have, for example, three to four springs or other biasing members 164. The springs may connect by a mounting ring to the injection head 104. The mounting ring may be larger than the injection head 104 main tube diameter but smaller than the flange ring that is directly above it. When the injection head 104 must be removed, the spring tension can be released and the springs disconnected so that the injection head can be unbolted and readily removed. This configuration may reduce the complexity of the injection head 104 by not requiring a second return or lifting piston to keep the injection head 104 from dropping down through the platen 116B (FIGS. 2-6). The configuration may also simplify the process of changing the mold 102, and may protect the injection heads 104 from damage by keeping them out of the range of contact with the mold 102 when not needed.

During use in molding cycles, the nozzle 138 of the injection head 104 may abut against the corresponding gate in the mold 102 as the additional pressure chamber 162 is pressurized and the outer body 130 is forced to the extended position relative to the mounting member 140. The nozzle 138 of the injection head 104 may be retracted away from the mold 102 (FIG. 1) when the additional pressure chamber 162 is depressurized and the outer body 130 returns to the retracted position responsive to the biasing force of the biasing members 164. By biasing the injection heads 104 to the retracted position using the biasing members 164, the potential for damage to the mold 102 and/or the injection heads 104 may be reduced when the mold 102 is removed from the molding station 101 (FIG. 1) for service or to change molds 102.

FIG. 10B illustrates the injection head 104 in a first state prior to an injection cycle. As shown therein, the polymer chamber 134 is full of molten thermoplastic material 146. The piston 132 is in the retracted position. The outer body 130 is also in the retracted position relative to the mounting member 140, such that the nozzle 138 would be retracted from the gate of the mold 102 (FIG. 1). Referring to FIG. 10C, upon commencement of a molding cycle, the additional pressure chamber 162 may be pressurized with a pressurized fluid to cause the outer body 130 to move to the extended position relative to the mounting member 140, so as to cause the nozzle 138 to abut against a corresponding gate in the mold 102. As shown in FIG. 10C, the pressure chamber 136 then may be pressurized with pressurized fluid to force the piston 132 to move to the extended position and inject the molten thermoplastic material 146 through the nozzle 138 and into the mold cavity 103 within the mold 102. After the injection of the molten thermoplastic material 146 into the mold 102, the additional pressure chamber 162 may be depressurized, allowing the biasing members 164 to force the outer body 130 to return to the retracted position relative to the mounting member 140, as shown in FIG. 10E. Additional molten thermoplastic material 146 then may be provided within the polymer chamber 134 through the polymer inlet 148 to refill the polymer chamber 134. The piston 132 may return to the retracted position as the molten thermoplastic material 146 fills the polymer chamber 134, which will complete the injection cycle and return the injection head 104 to the configuration of FIG. 10B.

It may be desirable to sense the location of the piston 132 in each of the injection heads 104 during an injection cycle for many purposes including, but not limited to, independently and selectively controlling the timing and speed of the injection stroke of the pistons 132. A sensor, such as a glass scale or a magnetic location sensor may be employed in each injection head 104 to sense the location of the piston 132 relative to the outer body 130. As another non-limiting example, each injection head 104 may include a string potentiometer configured and used as a sensor to sense the position of the piston 132 relative to the outer body 130. A stainless steel cable, for example, may connect to a component of the piston 132. This cable may connect to a spring-loaded string potentiometer (also referred to as a "string pot" sensor, a "cable-extension transducer" sensor, a "draw wire" sensor, or a "yo-yo" sensor). The electrical output of each of the string potentiometers may be operatively coupled to the control system 111 of the molding system 100, such that the control system 111 may be able to detect and control the positions of the pistons 132. Such string potentiometers may be less expensive than glass scales or magnetic sensors, and may also be able to be used in several other locations on the molding system 100 as desirable for sensing and/or controlling movable components of the molding system 100 that may be subject to high temperature and/or high pressure.

The nozzles 138 at the bottom of each injection head 104 may comprise check nozzles. The check nozzles 138 may preclude flow of molten thermoplastic material out from the injection heads 104 into the mold cavity 103 until the injection cycle is initiated. While spring loaded check valves or shut off nozzles may be used in standard injection molding, the injection heads 104 of the molding system 100 may have a nozzle 138 that may have a bearing pressed by a spring into a seal seat surface, which may preclude the flow of molten thermoplastic material 146 through the nozzle 138 when the pressure of the molten thermoplastic material 146 is below a predetermined pressure. As the pressure of the molten thermoplastic material 146 increases, the bearing may be pushed away from its seat surface to allow molten thermoplastic material 146 to flow through the nozzle 136. Cavities may be provided within the nozzle 138 adjacent the bearing, and the cavities may have a sufficient cross-sectional area to allow for relatively high flow rates of molten thermoplastic material 146 past the bearing while not allowing for the bearing to come out of position.

The pressure of the molten thermoplastic material 146 at each gate of the mold 102 may be separately, selectively controlled using the respective flow control valves 110 associated with the individual injection heads 104. This independent control of the pressure at each gate may be used to compensate for variations in the flow of the thermoplastic material within the mold cavity 103 due, for example, to varying or non-symmetric geometry of the article being molded within the mold 102. This may allow for a reduction in local pressure, for example, if there is flash (i.e., mold cavity 103 overflow) in one or more areas of the mold 102. The filling of each zone of the mold cavity 103 may be selectively tailored individually (e.g., optimized) by the corresponding injection head 104 and associated flow control valve 110 for each particular mold 102 employed. This may provide, among other benefits, reduced wear on the molds 102 and the other components of the molding system 100.

The individual control of the multiple injection heads 104 as described above may allow decreased clamp pressure between the platens 116A, 116B by pushing the molten plastic into the mold 102 from a plurality of locations at controlled speeds and pressures. The fill cycle may be accurately and progressively timed so that excess material may be reduced, and little, if any, excess pressure may be used to fill the mold cavity 103 within the mold 102. The reduced clamping pressure required may be due, at least in part, to not pushing a high volume of material through a single gate at higher pressures as would be required in a conventional injection molding system. Thus, the mold 102 may be clamped closed effectively with relatively lower pressure. Standard injection molding systems for molding similarly sized parts may require a clamping pressure as high as several thousand tons of pressure.

The control system 111 of the molding system 100 may have controls that allow the operator to adjust the pressure settings for each of the injection heads 104. As previously mentioned, the injection speed and injection pressure for each injection head 104 may be selectively and independently controlled.

In standard injection molding, the temperature regulation of the molds (generally to keep the molds cool enough to freeze the molten thermoplastic) may be accomplished by running fluid-channels through the mold and circulating cooled or heated fluid through those channels. In the molding system 100, the temperature of the mold 102 may be regulated indirectly by regulating the temperatures of the lower platen 116A and the upper platen 116B, rather than by regulating the temperature of the mold 102 directly. For example, temperature regulation plates 124A, 124B may be mounted to each of the lower platen 116A and the upper platen 116B. The mold halves 102A, 102B may directly contact the temperature regulation plates 124A, 124B when the mold halves 102A, 102B are mounted to or otherwise supported by the respective platens 116A, 116B. The temperature regulation plates 124A, 124B may comprise aluminum plates that have fluid passageways therein. Alternatively, pipes or other fluid conduits may be provided adjacent the temperature regulation plates 124A, 124B, for example in slots in temperature regulation plates 124A, 124B. Cooling or heating fluid may be caused to flow through the fluid passageways of the heating plates 124A, 124B, so as to cool or heat the temperature regulation plates 124A, 124B and the mold halves 102A, 102B. Thus, heat may be removed from or added to the mold halves 102A, 102B by thermal transfer. The temperature regulation plates 124A, 124B may be at least substantially stationary in the molding position, which may reduce the need to use flexible lines attached to the mold halves 102A, 102B. With this arrangement, the total movement of the fluid input/output lines during the molding process may be limited to the motion of the lower platen 116A, rather than the movement of the lower mold half 102A. This may significantly reduce the complexity of the cooling/heating fluid handling system and may thus reduce breakdowns and the corresponding need for equipment repair.

Figure 14:
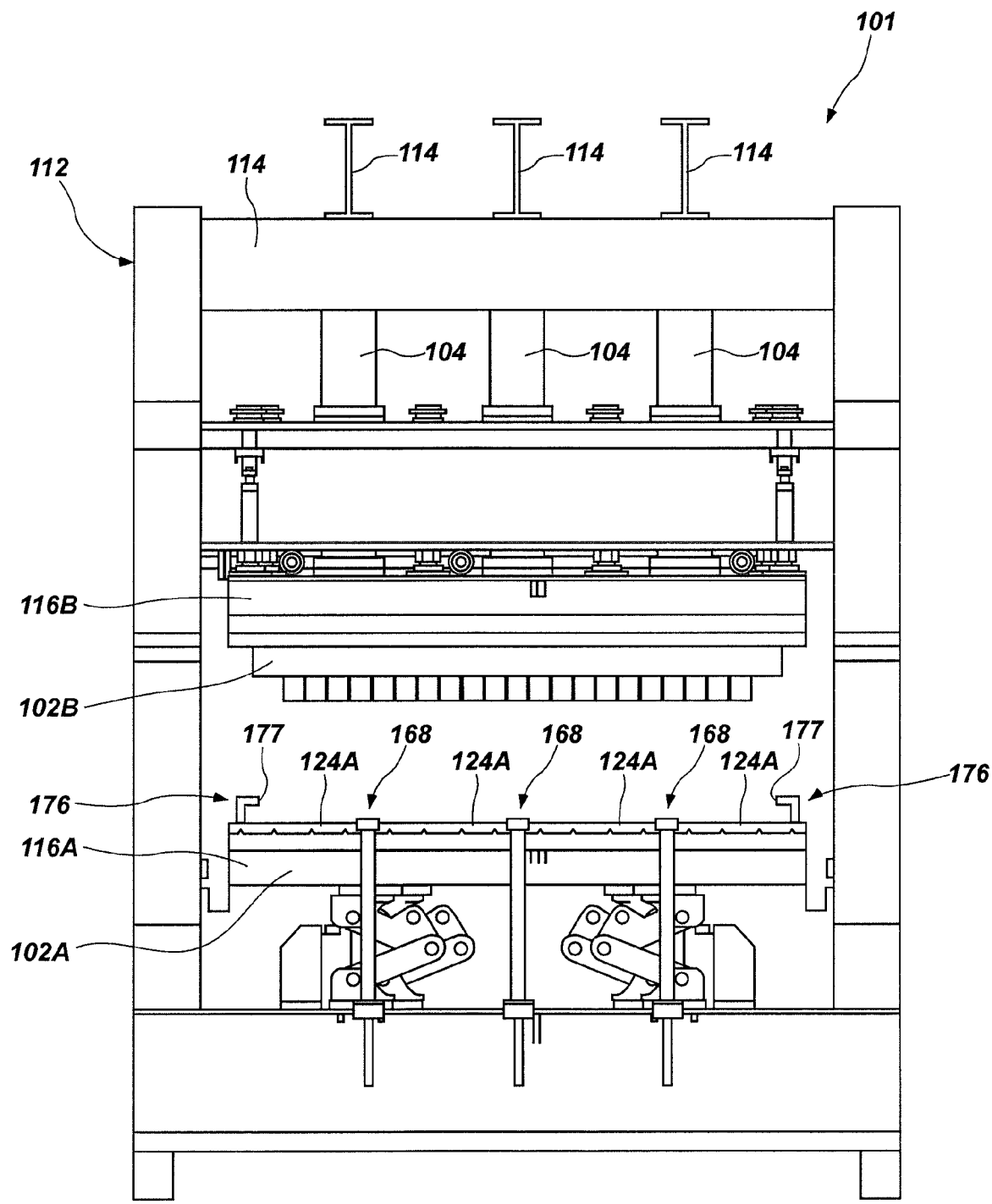
FIG. 14 is a side view of the molding station of FIGS. 2 through 6 illustrating a bearing system and mold retraction clamps on a lower platen of the molding station.
Figure 15:
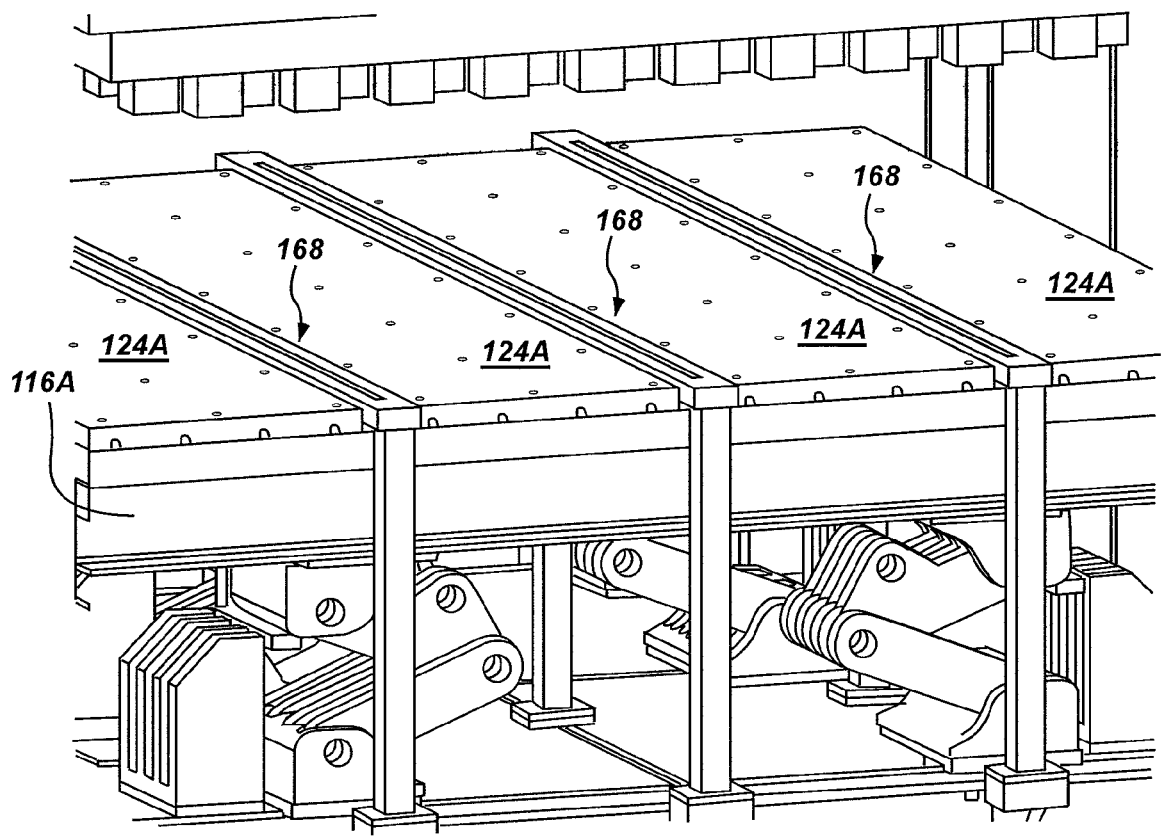
FIG. 15 is an enlarged perspective view illustrating the bearing system of the molding station.

Referring to FIG. 14, in the event that more than one lower mold half 102A is employed as described above, a bearing system 168 or other roller or roller members may be used to roll the lower mold halves 102A into and out from the molding position on the lower platen 116B. The bearing system 168 may include rollers mounted to the lower platen 116A. As a non-limiting example, the bearing system 168 may include three rows of roller bearings that may be held in place by a bearing frame carried by the lower platen 116A, as shown in FIG. 15. Each row of roller bearings may be disposed between temperature regulation plate 124A also carried on the lower platen 116A. The roller bearings may be configured to be movable relative to a surface of the lower platen 116A, such that, when the lower platen 116A is raised to lift the lower mold half 102A and close the mold 102, the bearings may be pushed into the lower platen 116A by the weight of or force from the mold 102 such that the lower mold half 102A is supported by the temperature regulation plates 124A and not the bearing system 168. As the lower platen 116A is lowered for part extraction, one or more lifters may come into contact with the bearing frame, forcing the bearing system 168 to project from the surface of the platen 116A and lift the mold half 102A off the temperature regulation plates 124A. At this point, the lower mold half 102A may be supported by the bearing system 168 and may be rolled off the platen 116A and onto one of the roller tables 126A, 126B for removal of a molded article from the mold cavity 103. This configuration may allow the lower mold half 102A of the mold 102 to move onto and off from the lower platen 116A freely while not causing undue damage to the bearing system 168 by having contact between the lower mold halves 102A and the bearing system 168 during the molding cycle.

Figure 12:
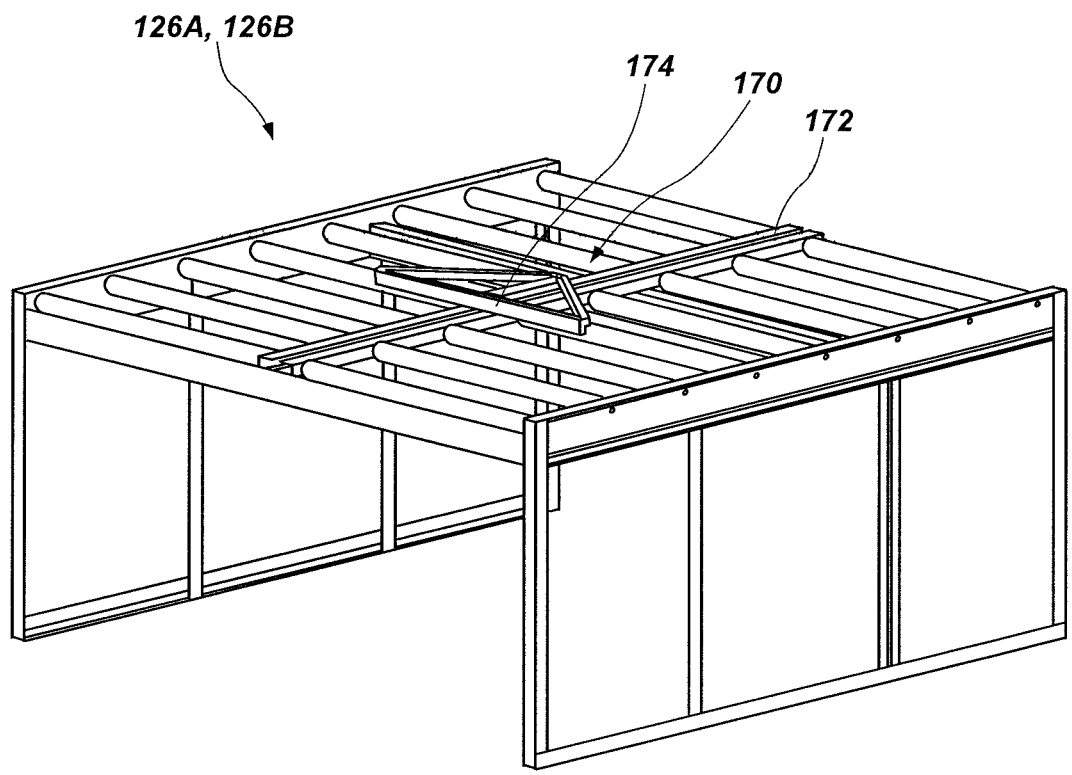
FIG. 12 is a perspective view of a roller table of the molding system of FIGS. 1 through 9.

The molding system 100 may further include a drive mechanism for driving movement of the lower mold halves 102A from the roller tables 126A, 126B into the molding position on the lower platen 116A, and for driving movement of the lower mold halves 102A out from the molding position on the lower platen 116A onto the roller tables 126A, 126B. For example, as shown in FIG. 12, each roller table 126A, 126B may include a chain drive system 170 that includes a circular chain mounted within a chain guide 172 extending along a center of the roller table 126A, 126B. A push bar 174 may be positioned over the surface of the roller table 126A, 126B. The push bar 174 may be affixed to the circular chain within the chain guide 172, such that rotation of the chain within the chain guide 172 causes the push bar 174 to move with the chain and slide back and forth along roller table 126A, 126, depending upon the direction of rotation of the circular chain. Rotation of the circular chain within the chain guide 172 may be driven by, for example, an electrical motor mounted under the roller table 126A, 126B. A drive shaft of the motor may be coupled to a cog that is engaged with the chain, such that, as the motor drives rotation of the drive shaft and cog attached thereto, rotation of the circular chain within the chain guide 172 is driven by the rotation of the cog. The push bar 174 may be configured to bear against a side of a lower mold half 102A resting upon the rollers of the roller table 126A, 126B. Thus, the drive mechanism may be used to push a lower mold half 102A resting upon the rollers of the roller table 126A, 126B off from the roller table 126A, 126B and into the molding position on the lower platen 116A.

Each lower mold half 102A may have a small framework off the center of the machine-facing side of the lower mold half 102A opposite the side thereof that is pushed by the push bar 174. This framework may have contactors or other features that may bear against another mold half 102A when they are pushed against one another by one of the push bars 174. For example, when one lower mold half 102A is to be moved from the first roller table 126A to the molding position over the lower platen 116A, the push bar 174 of the roller table 126A pushes that lower mold half 102A onto the platen 116A. Another lower mold half 102A, which may have just completed a molding cycle and have a molded article therein, may already be in position on the lower platen 116A. Thus, the first mold half 102A may push the second mold half 102A out from the molding position on the lower platen 116A and onto the second roller table 126B as the push bar 174 of the first roller table 126A pushes the first lower mold half 102A into the molding position. After the next molding cycle, the push bar 174 of the second lower table 126B pushes the second lower mold half 102A supported on the second roller table 126B into the molding position on the lower platen 116A and also pushes the first lower mold half 102A out from the molding position and back onto the first roller table 126A. Thus, the chain drive systems 170 on the roller tables 126A, 126B may push both of the lower mold halves 102A upon actuation thereof. On occasions when it is desired to employ only a single lower mold half 102A, the lower mold half 102A may be coupled to the push bar 174 or to another feature coupled to the chain, so that the drive system 170 of one of the roller tables 126A, 126B may be used to both push the lower mold half 102A onto the lower platen 116A and to pull the lower mold half 102A back onto the roller table 126A, 126B from the molding position on the lower platen 116A.

Referring again to FIG. 14, the lower platen 116A may also include a plurality of mold retraction clamps 176 or other clamp-like fingers arranged in a row on each side of the lower mold half 102A. As shown in FIG. 11A, the lower mold half 102A may include channel-like recesses 178 on two lateral sides thereof. As shown in FIG. 14, the mold retraction clamps 176 may include lateral projections 177 that extend into the channel-like recesses 178 on the lateral sides of the lower mold half 102A when the lower mold half 102A is in the molding position on the lower platen 116A. After a molding cycle, as the lower platen 116A is lowered, the lateral projections 177 of the mold retraction clamps 176 may engage the lower mold half 102A within the channel-like recesses 178 and pull the lower mold half 102A away from the upper mold half 102B. The two rows of mold retraction clamps 176 may extend over the edge of the lower mold half 102A as it is driven onto the lower platen 116A while it is in the lower, open position. The lower surfaces of the lateral projections 177 of the mold retraction clamps 176 may not come into contact with the lower mold half 102A unless and until the lower platen 116A begins to lower after completion of a mold cycle and the lower mold half 102A sticks to the upper mold half 102B. Thus, the mold retraction clamps 176 may not interfere with the lower mold half 102A, such that the lower mold half 102A may slide freely onto and off from the lower platen 116A. In the downward motion of the lower platen 116A after completion of a molding cycle, the mold retraction clamps 176 may come into contact with the lower mold half 102A and allow the lower platen 116A to exert a downward force on the lower mold half 102A causing the mold 102 to open and separating the lower mold half 102A from the upper mold half 102B and allowing the article molded therein to be extracted from the mold 102.

The position of the upper platen 116B on the frame 112 of the molding station 101 may be adjustable such that different molds 102 having different thicknesses may be used with the molding system 100. Each mold 102 may thus be able to be employed with an appropriate amount of clamping pressure for fabrication of acceptable molded articles. During the setup of a particular mold 102 having a particular mold thickness, the upper and lower mold halves 102A, 102B may be adjoined together and slid, rolled or otherwise moved into the molding position on the lower platen 116A. The lower platen 116A then may be moved slowly upward until the upper mold half 102B may be bolted in place on the upper platen 116B. Once the upper mold half 102B is bolted to the upper platen 116B, it may be desirable to adjust the closed position of the upper and lower platens 116A, 116B. The upper platen 116B may be fastened to one or more members of the frame 112 using, for example, a plurality (e.g., sixteen) adjustment bolts. The adjustment bolts may be connected to each other, and may be connected to an electric motor configured to drive rotation and adjustment of the adjustment bolts. Thus, the electric motor may be actuated and used to adjust the location of the upper platen 116B relative to the frame 112 by turning the adjustment bolts until the location of the upper platen 116B and the upper mold half 102B, as well as the mold clamping pressure are appropriate. If, during molding, one section of the mold 102 has too high or too low of a clamping pressure, one or more of the adjustment bolts may be disengaged from the electric motor and may be adjusted (i.e., raised or lowered) individually as needed.

Previously known injection molding machines for injection molding parts as large as mattresses, mattress foundations, and large pallets may have a footprint of about two to five times the area of the footprint of the molding station 101 of the molding system 100. By way of example and not limitation, the molding station 101 (which excludes the extruder or other polymer source, the hydraulic system for pressuring the fluid in the injection heads 104, the control station, and the roller tables) may have a footprint area of about 300 square feet or less, about 200 square feet or less, or even about 100 square feet or less, when using a mold having a mold face area of at least about 20 square feet, at least about 35 square feet, or even at least about 50 square feet.

When molding with soft elastomeric materials, such as a gelatinous elastomer in a buckling gel mattress or buckling gel mattress component as disclosed in the aforementioned U.S. Pat. Nos. 5,749,111 and 6,026,527, use of ejector pins to remove the molded part from the mold 102 may be ineffective, as the pins simply may penetrate into the soft material and not push the part out from the mold 102. Thus it may be advantageous to design and configure the mold 102, such that a molded article formed therein is nearly automatically removed from the mold cavity 103 when the first and second mold halves 102A, 102B are separated.

FIGS. 11A and 11B illustrate a non-limiting example of a lower mold half 102A that may be employed in the molding system 100 (FIG. 1) to mold a gelatinous elastomer mattress component comprising an array of buckling columns. The upper mold half 102B may be substantially similar to the lower mold half 102A, but mold cavity 103 may include features that form a mirror image of the features of the mold cavity 103 of the lower mold half 102A. Buckling gel is often made with hollow columns, requiring the mold 102 to have cores 180, which correspond to and form the hollow portions of the columns. The molten thermoplastic gelatinous elastomer fills the spaces of the mold cavity 103 between the mold cores 180 to form the walls of the buckling columns. If all the cores 180 are in one of the lower mold half 102A and the upper mold half 102B of the mold 102, it may be very difficult to pull the molded article out of the mold 102, even though gelatinous elastomer may shrink laterally due to Poisson's Effect as it is stretched during its extraction from the mold 102. It may be advantageous to have every other core in the lower mold half 102A, and the remainder of the cores 180 in the upper mold half 102B, or at least a majority of the cores 180 in one of the mold halves 102A, 102B and a minority of the cores 180 in the other of the mold halves 102A, 102B. In either case, the location and configuration of the cores 180 may be designed so that when the mold halves 102A, 102B separate, the molded article therein may be pulled at least substantially completely out of the mold cavity 103 and simply rests on and/or partially in the lower mold half 102A. When the article of manufacture to be molded includes features arranged in a grid or array (such as for a large buckling gel part), the cores 180 in the mold 102 that create the grid or array of features may be located in the mold 102 in a configuration such that each core on one mold half 102A, 102B is surrounded by cores 180 on the other mold half 102A, 102B when the mold halves 102A, 102B are adjoined together and the mold 102 is closed for molding. In additional embodiments, a portion of each core of the complete set of cores 180 may be provided in each of the mold halves 102A, 102B. In some such embodiments, the core portions may extend to the planes of the abutting mold faces of the mold halves 102A, 102B. In this configuration, the parting line of the cores 180 may be disposed at approximately the middle of the thickness of the molded part. In additional such embodiments, the core portions in the lower mold half 102A may extend approximately 60% through a thickness of the molded part, while the core portions in the upper mold half 102B may extend approximately 40% through the thickness of the molded part, such that the molded part will likely stay with the lower mold half 102A as the mold halves 102A, 102B are separated, but may be partially extracted even from the lower mold half 102A by the opening of the mold 102 and the associated pull of the molded part extracting from the portion of the mold cavity 103 in the upper mold half 102B.

When molding relatively large parts using the molding system 100, and particularly very large buckling gelatinous elastomer parts, venting of the mold 102 may be an issue since the air that must escape from the mold cavity 103 may be required to travel relatively long distances to escape the mold 102. Thus, it may be advantageous to vent the mold 102 across the entire surface of the mold faces of the mold halves 102A, 102B so that air may escape during molding and air may return to the mold cavity 103 as the mold 102 is opened and the part extracted therefrom. In standard injection molding, the cavities may have vents around the outer edges of the cavity. In the mold halves 102A, 102B shown in FIGS. 11A and 11B, which is configured for molding a buckling gelatinous elastomer part for use in a king-size mattress, each of the cores 180 may have a small venting recess formed toward the middle of the outer end surface of the core, which abuts against the opposing mold half 102A, 102B upon closing the mold 102. As a non-limiting example, the venting recess may comprise a crossed pair of grooves machined in the outer end surface of the cores 180. These grooves may also be connected to an air channel machined through a thickness of the lower mold half 102A or the upper mold half 102B, so that air is allowed to leave the mold cavity 103 during the molding process and enter the mold cavity 103 during opening of the mold 102 and extraction of the molded part. With the large parts that may be molded with this molding system 100 and molds 102, there may be a great deal of negative air pressure (suction) opposing the opening of the mold 102 due to the size of the molded parts. The embodiments described herein allow introduction of air to the entire mold face of the surfaces of the mold halves 102A, 102B through a restricted, one-way manner to eliminate or reduce suction. The system may allow air to enter the mold 102 after molding so that the mold halves 102A, 102B may separate upon opening of the mold 102 and may allow air out from the mold cavity 103 in a way that does not plug the venting systems.

Additional non-limiting example embodiments of the present disclosure are set forth below.

Embodiment 1

A molding system, comprising: a mold defining a mold cavity therein; a plurality of injection heads, each injection head of the plurality of injection heads configured to inject molten polymer into the mold cavity during a molding process, each injection head of the plurality of injection heads comprising: an outer body; a piston disposed within the outer body and defining a polymer chamber on a first side of the piston and a pressure chamber on an opposite second side of the piston, the piston configured to move back and forth within the outer body between a retracted position and an extended position, the piston configured to move from the retracted position to the extended position responsive to pressurization of the pressure chamber; and a nozzle through which molten polymer is injected from the polymer chamber into the mold cavity within the mold; and a polymer source configured to supply molten polymer to the polymer chamber of each injection head of the plurality of injection heads.

Embodiment 2

The molding system of Embodiment 1, further comprising: a pressure fluid source configured to supply a pressurized fluid to the pressure chamber of each injection head of the plurality of injection heads; and a plurality of selectively actuable hydraulic flow control valves, each flow control valve of the plurality of selectively actuable hydraulic flow control valves disposed between the pressure fluid source and a respective injection head of the plurality of injection heads and configured to selectively control flow of the pressurized fluid from the pressure fluid source to the respective injection head of the plurality of injection heads.

Embodiment 3

The molding system of Embodiment 1, wherein the mold includes a first mold half and a second mold half, the first mold half and the second mold half having complementary features defining the mold cavity therebetween when the first mold half and the second mold half are adjoined to one another.

Embodiment 4

The molding system of Embodiment 3, further comprising: a frame; a first platen coupled to the frame, the first mold half carried by the first platen; a second platen coupled to the frame, the second mold half carried by the second platen.

Embodiment 5

The molding system of Embodiment 4, wherein each injection head of the plurality of injection heads further comprises a mounting member configured to be coupled to the frame in a fixed position, the outer body of each injection head of the plurality of injection heads coupled to the mounting member and configured to move between an extended position and a retracted position relative to the mounting member.

Embodiment 6

The molding system of Embodiment 5, wherein each injection head of the plurality of injection heads further comprises an additional pressure chamber, pressurization of the additional pressure chamber causing the outer body of each injection head of the plurality of injection heads to move toward the extended position.

Embodiment 7

The molding system of Embodiment 6, wherein each injection head of the plurality of injection heads further comprises at least one biasing member configured to bias the outer body of the injection head toward the retracted position relative to the mounting member.

Embodiment 8

The molding system of Embodiment 4, wherein the first platen is configured to move toward the second platen to close the mold and to move away from the second platen to open the mold.

Embodiment 9

The molding system of Embodiment 8, further comprising a plurality of linear actuators and a plurality of toggle clamps, the plurality of linear actuators and the plurality of toggle clamps configured to work together to move the first platen toward and away from the second platen.

Embodiment 10

The molding system of Embodiment 8, wherein the first platen includes a plurality of mold retraction clamps configured to pull the first mold half away from the second mold half as the first platen moves away from the second platen.

Embodiment 11

The molding system of Embodiment 8, wherein the first platen and the second platen are oriented horizontally, the second platen located vertically over the first platen, the first platen configured to move vertically upward toward the second platen and vertically downward away from the second platen.

Embodiment 12

The molding system of Embodiment 4, wherein the molten polymer source is located remote from the frame, and wherein the molding system further comprises a heated conduit configured to carry molten polymer from the molten polymer source to the plurality of injection heads.

Embodiment 13

The molding system of Embodiment 12, further comprising a heated expandable reservoir disposed between the molten polymer source and the plurality of injection heads, the heated conduit including a first section between the molten polymer source and the heated expandable reservoir and a second section between the heated expandable reservoir and the plurality of injection heads.

Embodiment 14

The molding system of Embodiment 1, wherein each injection head of the plurality of injection heads further comprises a nozzle check valve associated with the nozzle, the nozzle check valve allowing molten polymer to be injected from the polymer chamber into the mold cavity within the mold and precluding molten polymer from flowing from the mold cavity back into the polymer chamber.

Embodiment 15

The molding system of Embodiment 1, wherein each injection head of the plurality of injection heads further comprises a polymer chamber check valve associated with the polymer chamber, the polymer chamber check valve allowing molten polymer to pass into the polymer chamber from the polymer source and precluding molten polymer from flowing out from the pressure chamber back toward the polymer source.

Embodiment 16

A method of molding an article of manufacture, comprising: providing a mold having a mold cavity therein; providing a plurality of injection heads each comprising: an outer body; a piston disposed within the outer body and defining a polymer chamber on a first side of the piston and a pressure chamber on an opposite second side of the piston, the piston configured to move back and forth within the outer body between a retracted position and an extended position, the piston configured to move from the retracted position to the extended position responsive to pressurization of the pressure chamber, and a nozzle through which molten polymer is injected from the polymer chamber into the mold cavity within the mold; melting a polymer at a molten polymer source; conveying molten polymer from the molten polymer source to the polymer chambers of the injection heads of the plurality of injection heads; and pressuring the pressure chamber and causing the piston to move from the retracted position to the extended position in each injection head of the plurality of injection heads to inject molten polymer into the mold cavity; and solidifying the molten polymer within the mold cavity to form the article of manufacture.

Embodiment 17

The method of Embodiment 16, wherein pressuring the pressure chamber comprises pressuring the pressure chamber with a pressurized fluid.

Embodiment 18

The method of Embodiment 17, further comprising selecting controlling flow of the pressurized fluid to each of the injection heads of the plurality of injection heads using a plurality of selectively actuable hydraulic flow control valves.

Embodiment 19

The method of Embodiment 16, wherein providing the mold having the mold cavity therein comprises providing a first mold half and a second mold half, the first mold half and the second mold half having complementary features defining the mold cavity therebetween when the first mold half and the second mold half are adjoined to one another.

Embodiment 20

The method of Embodiment 16, further comprising: coupling a first platen to a frame and carrying the first mold half on the first platen; coupling a second platen to the frame and carrying the second mold half on the second platen.

Embodiment 21

The method of Embodiment 20, further comprising coupling a mounting member of each injection head of the plurality of injection heads to the frame in a fixed position, and coupling the outer body of each injection head of the plurality of injection heads to a respective mounting member and configuring each outer body to move between an extended position and a retracted position relative to each respective mounting member.

Embodiment 22

The method of Embodiment 21, further comprising providing each injection head of the plurality of injection heads with an additional pressure chamber, and pressurizing the additional pressure chambers and causing the outer body of each injection head of the plurality of injection heads to move toward the extended position.

Embodiment 23

The method of Embodiment 22, further comprising biasing the outer body of each injection head of the plurality of injection heads toward the retracted position relative to the respective mounting member using at least one biasing member.

Embodiment 24

The method of Embodiment 20, further comprising configuring the first platen to move toward the second platen to close the mold, and to move away from the second platen to open the mold.

Embodiment 25

The method of Embodiment 24, further comprising using a plurality of linear actuators and a plurality of toggle clamps together to move the first platen toward and away from the second platen.

Embodiment 26

The method of Embodiment 24, further comprising using a plurality of mold retraction clamps on the first platen to pull the first mold half away from the second mold half as the first platen moves away from the second platen.

Embodiment 27

The method of Embodiment 24, further comprising orienting the first platen and the second platen horizontally, locating the second platen vertically over the first platen, and moving the first platen vertically upward toward the second platen and vertically downward away from the second platen.

Embodiment 28

The method of Embodiment 20, further comprising locating a source of the molten polymer remotely from the frame, and carrying the molten polymer from the source to the plurality of injection heads through a heated conduit.

Embodiment 29

The method of Embodiment 28, further comprising providing a heated expandable reservoir between the molten polymer source and the plurality of injection heads, the heated conduit including a first section extending between the molten polymer source and the heated expandable reservoir and a second section extending between the heated expandable reservoir and the plurality of injection heads.

Embodiment 30

The method of Embodiment 16, further comprising providing a nozzle check valve in the nozzle of each injection head of the plurality of injection heads, and using the nozzle check valve to allow molten polymer to be injected from the polymer chamber into the mold cavity within the mold and preclude molten polymer from flowing from the mold cavity back into the polymer chamber.

Embodiment 31

The method of Embodiment 16, further comprising providing a polymer chamber check valve associated with the polymer chamber of each injection head of the plurality of injection heads, and using the polymer chamber check valve to allow molten polymer to pass into the polymer chamber from the polymer source and to preclude molten polymer from flowing out from the pressure chamber back toward the polymer source.

The example embodiments of the disclosure described above do not limit the scope of the invention, since these embodiments are merely examples of embodiments of the invention, which is defined by the scope of the appended claims and their legal equivalents. Any equivalent embodiments are intended to be within the scope of this invention. Indeed, various modifications of the disclosure, in addition to those shown and described herein, such as alternative useful combinations of the elements described, will become apparent to those skilled in the art from the description. Such modifications and embodiments are also intended to fall within the scope of the appended claims.

What is claimed is:

1. A molding system, comprising:
a mold defining a mold cavity therein;
a plurality of injection heads, each injection head of the plurality of injection heads configured to inject molten polymer into the mold cavity during a molding process, each injection head of the plurality of injection heads comprising:
an outer body;
a piston disposed within the outer body and defining a polymer chamber on a first side of the piston and a pressure chamber on an opposite second side of the piston, the piston configured to move back and forth within the outer body between a retracted position and an extended position, the piston configured to move from the retracted position to the extended position responsive to pressurization of the pressure chamber; and
a nozzle through which molten polymer is injected from the polymer chamber into the mold cavity within the mold; and
a polymer source configured to supply molten polymer to the polymer chamber of each injection head of the plurality of injection heads.

2. The molding system of claim 1, further comprising:
a pressure fluid source configured to supply a pressurized fluid to the pressure chamber of each injection head of the plurality of injection heads; and
a plurality of selectively actuable hydraulic flow control valves, each flow control valve of the plurality of selectively actuable hydraulic flow control valves disposed between the pressure fluid source and a respective injection head of the plurality of injection heads and configured to selectively control flow of the pressurized fluid from the pressure fluid source to the respective injection head of the plurality of injection heads.

3. The molding system of claim 1, wherein the mold includes a first mold half and a second mold half, the first mold half and the second mold half having complementary features defining the mold cavity therebetween when the first mold half and the second mold half are adjoined to one another.

4. The molding system of claim 3, further comprising:
a frame;
a first platen coupled to the frame, the first mold half carried by the first platen; and
a second platen coupled to the frame, the second mold half carried by the second platen.

5. The molding system of claim 4, wherein each injection head of the plurality of injection heads further comprises a mounting member configured to be coupled to the frame in a fixed position, the outer body of each injection head of the plurality of injection heads coupled to the mounting member and configured to move between an extended position and a retracted position relative to the mounting member.

6. The molding system of claim 5, wherein each injection head of the plurality of injection heads further comprises an additional pressure chamber, pressurization of the additional pressure chamber causing the outer body of each injection head of the plurality of injection heads to move toward the extended position.

7. The molding system of claim 6, wherein each injection head of the plurality of injection heads further comprises at least one biasing member configured to bias the outer body of the injection head toward the retracted position relative to the mounting member.

8. The molding system of claim 4, wherein the first platen is configured to move toward the second platen to close the mold and to move away from the second platen to open the mold.

9. The molding system of claim 8, further comprising a plurality of linear actuators and a plurality of toggle clamps, the plurality of linear actuators and the plurality of toggle clamps configured to work together to move the first platen toward and away from the second platen.

10. The molding system of claim 8, wherein the first platen includes a plurality of mold retraction clamps configured to pull the first mold half away from the second mold half as the first platen moves away from the second platen.

11. The molding system of claim 8, wherein the first platen and the second platen are oriented horizontally, the second platen located vertically over the first platen, the first platen configured to move vertically upward toward the second platen and vertically downward away from the second platen.

12. The molding system of claim 4, wherein the molten polymer source is located remote from the frame, and wherein the molding system further comprises a heated conduit configured to carry molten polymer from the molten polymer source to the plurality of injection heads.

13. The molding system of claim 12, further comprising a heated expandable reservoir disposed between the molten polymer source and the plurality of injection heads, the heated conduit including a first section between the molten polymer source and the heated expandable reservoir and a second section between the heated expandable reservoir and the plurality of injection heads.

14. The molding system of claim 1, wherein each injection head of the plurality of injection heads further comprises a nozzle check valve associated with the nozzle, the nozzle check valve allowing molten polymer to be injected from the polymer chamber into the mold cavity within the mold and precluding molten polymer from flowing from the mold cavity back into the polymer chamber.

15. The molding system of claim 1, wherein each injection head of the plurality of injection heads further comprises a polymer chamber check valve associated with the polymer chamber, the polymer chamber check valve allowing molten polymer to pass into the polymer chamber from the polymer source and precluding molten polymer from flowing out from the pressure chamber back toward the polymer source.

16. A method of molding an article of manufacture, comprising:
providing a mold having a mold cavity therein;
providing a plurality of injection heads each comprising:
an outer body;
a piston disposed within the outer body and defining a polymer chamber on a first side of the piston and a pressure chamber on an opposite second side of the piston, the piston configured to move back and forth within the outer body between a retracted position and an extended position, the piston configured to move from the retracted position to the extended position responsive to pressurization of the pressure chamber; and
a nozzle through which molten polymer is injected from the polymer chamber into the mold cavity within the mold;
melting a polymer at a molten polymer source;
conveying molten polymer from the molten polymer source to the polymer chambers of the injection heads of the plurality of injection heads;
pressurizing the pressure chamber and causing the piston to move from the retracted position to the extended position in each injection head of the plurality of injection heads to inject molten polymer into the mold cavity; and
solidifying the molten polymer within the mold cavity to form the article of manufacture.

17. The method of claim 16, wherein pressurizing the pressure chamber comprises pressurizing the pressure chamber with a pressurized fluid.

18. The method of claim 17, further comprising selecting controlling flow of the pressurized fluid to each of the injection heads of the plurality of injection heads using a plurality of selectively actuable hydraulic flow control valves.

19. The method of claim 16, wherein providing the mold having the mold cavity therein comprises providing a first mold half and a second mold half, the first mold half and the second mold half having complementary features defining the mold cavity therebetween when the first mold half and the second mold half are adjoined to one another.

20. The method of claim 16, further comprising:
coupling a first platen to a frame and carrying the first mold half on the first platen;
coupling a second platen to the frame and carrying the second mold half on the second platen.

21. The method of claim 20, further comprising coupling a mounting member of each injection head of the plurality of injection heads to the frame in a fixed position, and coupling the outer body of each injection head of the plurality of injection heads to a respective mounting member and configuring each outer body to move between an extended position and a retracted position relative to each respective mounting member.

22. The method of claim 21, further comprising providing each injection head of the plurality of injection heads with an additional pressure chamber, and pressurizing the additional pressure chambers and causing the outer body of each injection head of the plurality of injection heads to move toward the extended position.

23. The method of claim 22, further comprising biasing the outer body of each injection head of the plurality of injection heads toward the retracted position relative to the respective mounting member using at least one biasing member.

24. The method of claim 20, further comprising configuring the first platen to move toward the second platen to close the mold, and to move away from the second platen to open the mold.

25. The method of claim 24, further comprising using a plurality of linear actuators and a plurality of toggle clamps together to move the first platen toward and away from the second platen.

26. The method of claim 24, further comprising using a plurality of mold retraction clamps on the first platen to pull the first mold half away from the second mold half as the first platen moves away from the second platen.

27. The method of claim 24, further comprising orienting the first platen and the second platen horizontally, locating the second platen vertically over the first platen, and moving the first platen vertically upward toward the second platen and vertically downward away from the second platen.

28. The method of claim 20, further comprising locating a source of the molten polymer remotely from the frame, and carrying the molten polymer from the source to the plurality of injection heads through a heated conduit.

29. The method of claim 28, further comprising providing a heated expandable reservoir between the molten polymer source and the plurality of injection heads, the heated conduit including a first section extending between the molten polymer source and the heated expandable reservoir and a second section extending between the heated expandable reservoir and the plurality of injection heads.

30. The method of claim 16, further comprising providing a nozzle check valve in the nozzle of each injection head of the plurality of injection heads, and using the nozzle check valve to allow molten polymer to be injected from the polymer chamber into the mold cavity within the mold and preclude molten polymer from flowing from the mold cavity back into the polymer chamber.

31. The method of claim 16, further comprising providing a polymer chamber check valve associated with the polymer chamber of each injection head of the plurality of injection heads, and using the polymer chamber check valve to allow molten polymer to pass into the polymer chamber from the polymer source and to preclude molten polymer from flowing out from the pressure chamber back toward the polymer source.

* * * * *

UNITED STATES PATENT AND TRADEMARK OFFICE
CERTIFICATE OF CORRECTION

PATENT NO. : 9,446,542 B2  
APPLICATION NO. : 14/144362  
DATED : September 20, 2016  
INVENTOR(S) : Russell B. Whatcott and LaVon Lee Bennett Page 1 of 1

It is certified that error appears in the above-identified patent and that said Letters Patent is hereby corrected as shown below:

In the Specification

| | | |
|---|---|---|
| Column 13, | Line 3, | change "head through" to --head 104 through-- |
| Column 14, | Lines 14-16, | delete second occurrence of sentence "Each injection head 104 may have, for example, three to four springs or other biasing members 164." |
| Column 19, | Line 29, | change "pressuring the fluid" to --pressurizing the fluid-- |
| Column 23, | Line 42, | change "and pressuring the" to --and pressurizing the-- |
| Column 23, | Line 51, | change "wherein pressuring the" to --wherein pressurizing the-- |
| Column 23, | Line 52, | change "comprises pressuring the" to --comprises pressurizing the-- |

Signed and Sealed this  
Twenty-first Day of February, 2017

Michelle K. Lee  
*Director of the United States Patent and Trademark Office*